(12) United States Patent
Dai et al.

(10) Patent No.: US 12,028,145 B2
(45) Date of Patent: Jul. 2, 2024

(54) MULTI-BEAM BASED PHYSICAL LAYER SECURITY ENHANCEMENT

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/534,996

(22) Filed: Nov. 24, 2021

(65) Prior Publication Data

US 2023/0164547 A1 May 25, 2023

(51) Int. Cl.
*H04B 7/06* (2006.01)
*H04B 7/0408* (2017.01)

(52) U.S. Cl.
CPC .......... *H04B 7/0695* (2013.01); *H04B 7/0408* (2013.01)

(58) Field of Classification Search
CPC ............................ H04B 7/0695; H04B 7/0408
USPC ......................................................... 370/334
See application file for complete search history.

(56) References Cited

U.S. PATENT DOCUMENTS

| | | | |
|---|---|---|---|
| 2005/0254513 A1* | 11/2005 | Cave ..................... | H04W 16/28 370/278 |
| 2012/0328036 A1* | 12/2012 | Chang .................. | H01Q 1/2266 375/267 |
| 2017/0366982 A1* | 12/2017 | Chang .................. | H01Q 1/2266 |
| 2020/0281035 A1* | 9/2020 | Di Pietro ............. | H04B 17/318 |
| 2023/0047193 A1* | 2/2023 | Lehti ................. | H04W 72/1263 |

* cited by examiner

*Primary Examiner* — Mang Hang Yeung
(74) *Attorney, Agent, or Firm* — Holland & Hart

(57) ABSTRACT

Methods, systems, and devices for wireless communications are described. A communication device may support beamformed communications, which may be implemented via reflection from environmental clusters, assistance from relays, repeaters, reconfigurable intelligence surface nodes, or some combination thereof. The communication device may partition a packet into multiple subpackets, where the communication device may assign one or more subpackets to one or more beams within a set of beams for beamformed communications. That is, the communication device may split the packet across the set of beams used for beamformed communications with another communication device. The subpackets may not be decodable independently. As such, the communication device may indicate which beams correspond to which subpackets to enable concatenation and decoding at the other communication device.

30 Claims, 13 Drawing Sheets

MULTI-BEAM BASED PHYSICAL LAYER SECURITY ENHANCEMENT

FIELD OF TECHNOLOGY

The following relates to wireless communications, including multi-beam based physical layer security enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A communication device may support various security functionalities, such as ciphering and integrity protection to secure wireless communications (e.g., packets). In some cases, the wireless communications might not be protected by these security functionalities due to latency requirements. Such unprotected wireless communications may be a security threat to other communication devices. For example, without the security protection, the communication devices might not be able to distinguish between a malicious and non-malicious packet, which may be a potential security threat to the communication devices.

SUMMARY

Various aspects of the present disclosure relate to enabling security between communication devices. To increase security between communication devices, a communication device (e.g., a base station) may segment a packet into multiple subpackets, where the communication device may assign one or more subpackets to one or more beams within a set of beams for beamformed communications to another communication device (e.g., a UE). That is, the communication device may split the packet across the set of beams used for beamformed communications. The subpackets may not be decodable independently. That is, individual subpackets may not be decodable independently, and may be decoded by the other communication device if a number of subpackets (e.g., all subpackets, a threshold number of subpackets) are received at the other communication device. The communication device may indicate which beams correspond to which subpackets to enable concatenation and decoding at the other communication device. By utilizing beamformed communication (e.g., multiple beams) to communicate the segmented packet, the communication devices may increase overall security for the packet.

A method for wireless communication at a device is described. The method may include segmenting a packet of information for a receiving device into a set of multiple subpackets, selecting a set of beams to use for transmission of the set of multiple subpackets, transmitting at least a number of subpackets of the set of multiple subpackets on a different beam of the set of beams, and receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

An apparatus for wireless communication at a device is described. The apparatus may include a processor, memory coupled with the processor, and instructions stored in the memory. The instructions may be executable by the processor to cause the apparatus to segment a packet of information for a receiving device into a set of multiple subpackets, select a set of beams to use for transmission of the set of multiple subpackets, transmit at least a number of subpackets of the set of multiple subpackets on a different beam of the set of beams, and receive a subset of feedback bits of a set of multiple subsets of feedback bits associated with at least the number of subpackets on one or more beams of the set of beams based on transmitting at least the number of subpackets of the set of multiple subpackets on one or more beams of the set of beams.

Another apparatus for wireless communication at a device is described. The apparatus may include means for segmenting a packet of information for a receiving device into a set of multiple subpackets, means for selecting a set of beams to use for transmission of the set of multiple subpackets, means for transmitting at least a number of subpackets of the set of multiple subpackets on a different beam of the set of beams, and means for receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

A non-transitory computer-readable medium storing code for wireless communication at a device is described. The code may include instructions executable by a processor to segment a packet of information for a receiving device into a set of multiple subpackets, select a set of beams to use for transmission of the set of multiple subpackets, transmit at least a number of subpackets of the set of multiple subpackets on a different beam of the set of beams, and receive a subset of feedback bits of a set of multiple subsets of feedback bits associated with at least the number of subpackets on different beams of the set of beams based on transmitting at least the number of subpacket of the set of multiple subpackets on one or more beams of the set of beams.

Some examples of the method, apparatuses, and non-transitory computer-readable medium described herein may further include operations, features, means, or instructions for receiving a beam report indicating the set of beams to use for the transmission of the set of multiple subpackets and where selecting the set of beams to use for the transmission of the set of multiple subpackets may be further based on the received beam report.

Some examples of the method, apparatuses, and non-transitory computer-readable medium described herein may further include operations, features, means, or instructions for determining the set of beams according to an information element (IE) field of the beam report, the IE field including one or more of a beam index, a reference signal resource index, a transmission configuration indicator (TCI) state index, or a transmit-receive point (TRP) index and where selecting the set of beams to use for the transmission of the set of multiple subpackets may be further based on determining the set of beams according to the IE field of the beam report.

Some examples of the method, apparatuses, and non-transitory computer-readable medium described herein may further include operations, features, means, or instructions for receiving a channel state information (CSI) report for the set of beams, the CSI report including one or more of a channel quality indicator (CQI), a rank indicator (RI), or a precoding matrix indicator (PMI) and where selecting the set of beams to use for the transmission of the set of multiple subpackets may be further based on the CSI report for the set of beams.

Some examples of the method, apparatuses, and non-transitory computer-readable medium described herein may further include operations, features, means, or instructions for encoding the set of multiple subpackets by jointly encrypting a quantity of subpackets of the set of multiple subpackets using one or both of a coding scheme or a channel coding scheme, where each subpacket of the set of multiple subpackets may be not decodable separately from other subpackets of the set of multiple subpackets based on the encoding and where transmitting at least the number of subpackets of the set of multiple subpackets may be further based on jointly encrypting the set of multiple subpackets.

In some examples of the method, apparatuses, and non-transitory computer-readable medium described herein, encoding the set of multiple subpackets may include operations, features, means, or instructions for jointly encrypting the set of multiple subpackets using one or both of a rateless coding scheme or the channel coding scheme.

Some examples of the method, apparatuses, and non-transitory computer-readable medium described herein may further include operations, features, means, or instructions for determining a threshold quantity of subpackets for encoding the set of multiple subpackets based on a CSI report for the set of beams and where encoding the set of multiple subpackets by jointly encrypting the quantity of subpackets of the set of multiple subpackets may be further based on the threshold quantity of subpackets.

Some examples of the method, apparatuses, and non-transitory computer-readable medium described herein may further include operations, features, means, or instructions for transmitting control signaling indicating a mapping between each subpacket of the set of multiple subpackets and each beam of the set of beams, or each subset of feedback bits of the set of multiple subsets of feedback bits and each beam of the set of beams, or a combination thereof and where receiving the subset of feedback bits of the set of multiple subsets of feedback bits on the different beams of the set of beams may be further based on the mapping.

Some examples of the method, apparatuses, and non-transitory computer-readable medium described herein may further include operations, features, means, or instructions for transmitting control signaling scheduling the set of beams to use for the transmission of the set of multiple subpackets, the control signaling including one or both of dynamic control signaling or semi-static control signaling and where transmitting at least the number of subpackets of the set of multiple subpackets may be further based on transmitting the control signaling scheduling the set of beams.

In some examples of the method, apparatuses, and non-transitory computer-readable medium described herein, the dynamic control signaling includes a downlink control information (DCI) and the semi-static control signaling includes one or both of a medium access control-control element (MAC-CE) or a radio resource control (RRC) message.

In some examples of the method, apparatuses, and non-transitory computer-readable medium described herein, the control signaling indicates the transmission of the set of multiple subpackets based on an association between an IE field associated with the control signaling and the set of beams, the IE field corresponding to a TCI index, a time-domain resource allocation (TDRA) index, a hybrid automatic repeat request (HARQ) index, or a bandwidth part index, or a combination thereof.

Some examples of the method, apparatuses, and non-transitory computer-readable medium described herein may further include operations, features, means, or instructions for assigning an IE field associated with the control signaling to indicate the transmission of the set of multiple subpackets and where transmitting at least the number of subpackets of the set of multiple subpackets may be further based on assigning the IE field associated with the control signaling to indicate the transmission of the set of multiple subpackets.

In some examples of the method, apparatuses, and non-transitory computer-readable medium described herein, each subset of feedback bits of the set of multiple subsets of feedback bits corresponds to one or both of a partition of a HARQ codebook or an interleaving portion of the HARQ codebook.

Some examples of the method, apparatuses, and non-transitory computer-readable medium described herein may further include operations, features, means, or instructions for receiving control signaling indicating the transmission of each subset of feedback bits of the set of multiple subsets of feedback bits on the different beams of the set of beams based on an uplink channel resource index, the uplink channel resource index including a physical uplink control channel resource index or a physical uplink shared channel resource index corresponding to the set of beams and where receiving the subset of feedback bits of the set of multiple subsets of feedback bits on the different beams of the set of beams may be further based on the uplink channel resource index.

In some examples of the method, apparatuses, and non-transitory computer-readable medium described herein, the set of beams for the transmission of each subset of feedback bits of the set of multiple subsets of feedback bits may be different from the set of beams for the transmission of each subpacket of the set of multiple subpackets.

In some examples of the method, apparatuses, and non-transitory computer-readable medium described herein, different subpackets of the set of multiple subpackets correspond to different code blocks, redundancy versions, interleaving resources in one or both of a time domain or a frequency domain, or a combination thereof.

Some examples of the method, apparatuses, and non-transitory computer-readable medium described herein may further include operations, features, means, or instructions for multiplexing the set of multiple subpackets in one or more of a frequency domain, a time domain, or a spatial domain based on a FDM scheme, a TDM scheme, or a spatial-division multiplexing (SDM) scheme, or a combination thereof and where transmitting each subpacket of the set of multiple subpackets may be further based on multiplexing the set of multiple subpackets in one or more of the frequency domain, the time domain, or the spatial domain.

In some examples of the method, apparatuses, and non-transitory computer-readable medium described herein, each beam of the set of beams corresponds to one or more of a beam index, a reference signal resource index, a TCI state index, or a TRP index.

In some examples of the method, apparatuses, and non-transitory computer-readable medium described herein, each beam of the set of beams includes a synchronization signal block (SSB) beam associated with a respective subpacket of the set of multiple subpackets.

In some examples of the method, apparatuses, and non-transitory computer-readable medium described herein, each subset of feedback bits of the set of multiple subsets of feedback bits includes HARQ feedback bits.

In some examples of the method, apparatuses, and non-transitory computer-readable medium described herein, a first order of beams of the set of beams used for transmission of the plurality of subpackets is different than a second order of beams of the one or more beams used to transmit the subset of feedback bits.

A method for wireless communication at a device is described. The method may include receiving at least a number of subpackets of a set of multiple subpackets on different beams of a set of beams, generating feedback based on receiving at least the number of subpackets of the set of multiple subpackets, segmenting the feedback into a set of multiple subsets of feedback bits, and transmitting each subset of feedback bits of the set of multiple subsets of feedback bits on one or more beams of the set of beams.

An apparatus for wireless communication at a device is described. The apparatus may include a processor, memory coupled with the processor, and instructions stored in the memory. The instructions may be executable by the processor to cause the apparatus to receive at least a number of subpackets of a set of multiple subpackets on different beams of a set of beams, generate feedback based on receiving at least the number of subpackets of the set of multiple subpackets, segment the feedback into a set of multiple subsets of feedback bits, and transmit each subset of feedback bits of the set of multiple subsets of feedback bits on one or more beams of the set of beams.

Another apparatus for wireless communication at a device is described. The apparatus may include means for receiving at least a number of subpackets of a set of multiple subpackets on different beams of a set of beams, means for generating feedback based on receiving at least the number of subpackets of the set of multiple subpackets, means for segmenting the feedback into a set of multiple subsets of feedback bits, and means for transmitting each subset of feedback bits of the set of multiple subsets of feedback bits on one or more beams of the set of beams.

A non-transitory computer-readable medium storing code for wireless communication at a device is described. The code may include instructions executable by a processor to receive at least a number of subpackets of a set of multiple subpackets on different beams of a set of beams, generate feedback based on receiving at least the number of subpackets of the set of multiple subpackets, segment the feedback into a set of multiple subsets of feedback bits, and transmit each subset of feedback bits of the set of multiple subsets of feedback bits on one or more beams of the set of beams.

Some examples of the method, apparatuses, and non-transitory computer-readable medium described herein may further include operations, features, means, or instructions for aggregating the set of multiple subpackets to form a packet based on receiving each subpacket of the set of multiple subpackets on the different beams of the set of beams.

Some examples of the method, apparatuses, and non-transitory computer-readable medium described herein may further include operations, features, means, or instructions for transmitting a beam report indicating the set of beams to use for transmission of the set of multiple subpackets and where receiving at least the number of subpackets of the set of multiple subpackets on the different beams of the set of beams may be further based on the transmitted beam report.

Some examples of the method, apparatuses, and non-transitory computer-readable medium described herein may further include operations, features, means, or instructions for transmitting a CSI report for the set of beams, the CSI report including one or more of a CQI, a RI, or a PMI and where receiving at least the number of subpackets of the set of multiple subpackets on the different beams of the set of beams may be further based on the CSI report for the set of beams.

Some examples of the method, apparatuses, and non-transitory computer-readable medium described herein may further include operations, features, means, or instructions for determining that each subpacket of the set of multiple subpackets may be not decodable separately from other subpackets of the set of multiple subpackets, decoding the set of multiple subpackets by jointly decrypting a quantity of subpackets of the set of multiple subpackets using one or both of a coding scheme or a channel coding scheme, and where receiving at least the number of subpackets of the set of multiple subpackets may be further based on jointly encrypting the set of multiple subpackets.

In some examples of the method, apparatuses, and non-transitory computer-readable medium described herein, decoding the set of multiple subpackets may include operations, features, means, or instructions for jointly decrypting the set of multiple subpackets using one or both of a rateless coding scheme or the channel coding scheme.

Some examples of the method, apparatuses, and non-transitory computer-readable medium described herein may further include operations, features, means, or instructions for determining a threshold quantity of subpackets for decoding the set of multiple subpackets based on a CSI report for the set of beams and where decoding the set of multiple subpackets by jointly decrypting the quantity of subpackets of the set of multiple subpackets may be further based on the threshold quantity of subpackets.

Some examples of the method, apparatuses, and non-transitory computer-readable medium described herein may further include operations, features, means, or instructions for performing a beam measurement on each beam of the set of beams, determining a beam quality for each beam of the set of beams based on the performed beam measurement, the beam quality corresponding to reference signal received power (RSRP) value for each beam of the set of beams, and where receiving at least the number of subpackets of the set of multiple subpackets on the different beams of the set of beams may be further based on the determined beam quality for each beam of the set of beams.

DETAILED DESCRIPTION

A wireless communications system may include various communication devices such as a UE and a base station, which may provide wireless communication services to the UE. The wireless communications system, in some examples, may support multiple radio access technologies including 4G systems, such as 4G LTE, as well as 5G systems, which may be referred to as 5G NR. A communication device (e.g., a base station) may segment a packet into multiple subpackets, where the communication device may assign one or more subpackets to one or more beams within a set of beams for beamformed communications to another communication device (e.g., a UE). That is, the communication device may split the packet across the set of beams used for beamformed communications. A set of beams may include one or more beams. In some examples, the individual subpackets may not be decodable independently, and may be decoded by the other communication device if a number of subpackets (e.g., all subpackets, a threshold number of subpackets) are received at the other communication device. The communication device may indicate which beams correspond to which subpackets to enable concatenation and decoding at the other communication device. By utilizing beamformed communication (e.g., multiple beams) to communicate the segmented packet, the communication devices may increase overall security for the packet.

Aspects of the disclosure are initially described in the context of wireless communications systems. Aspects of the disclosure are further illustrated and described with reference to a process flow. Aspects of the disclosure are further illustrated by and described with reference to apparatus diagrams, system diagrams, and flowcharts that relate to multi-beam based physical layer security enhancement.

Figure 1:
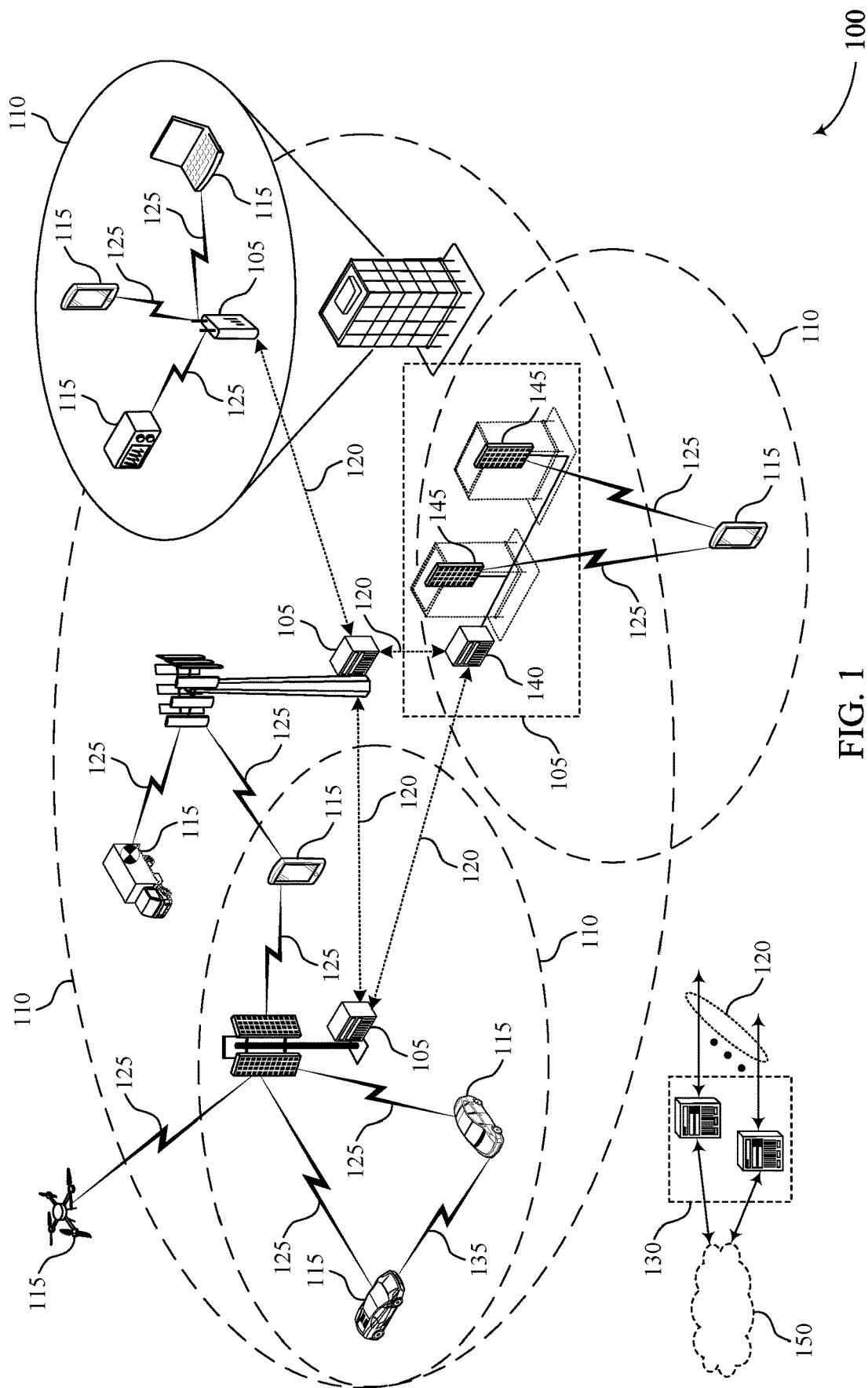
FIGS. 1 and 2 illustrate examples of wireless communications systems that support multi-beam based physical layer security enhancement in accordance with aspects of the present disclosure.

FIG. 1 illustrates an example of a wireless communications system 100 that supports multi-beam based physical layer security enhancement in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support various radio access technologies, one or more security measures may be implemented to protect communications between base stations 105 and UEs 115 associated with the various radio access technologies. For example (e.g., in GSM, UMTS, LTE, NR), ciphering (e.g., encoding transmissions) and integrity protection (e.g., protecting against accidental or deliberate insertion of additional code or information within transmissions) may be optionally implemented for communications between base stations 105 and UEs 115. Such techniques may be optionally applied to both control plane (e.g., radio resource control (RRC) signaling through signaling radio bearers (SRBs)) and user plane (e.g., data radio bearer (DRB)) data in packet data convergence protocol (PDCP) layers. In some examples, the aforementioned security implementations may be a function of one or more access security management entity (ASME) keys.

In some cases, scheduled transmissions (e.g., downlink) may not be protected by the aforementioned security functionalities. For example, medium access control-control element (MAC-CE) messaging may prioritize transfer delays over reliability (e.g., latency over integrity). Additionally, broadcast information, such as system information block (SIB) messaging and paging information, may similarly lack the aforementioned security functionalities to decrease latency. In such cases, malicious intruders or jammers may hinder or hijack unprotected transmissions by fabricating the transmission (e.g., SIB, MAC-CE) by using a format similar to the transmissions (e.g., physical downlink control channel (PDCCH), physical downlink shared channel (PDSCH)). Without security protection, base stations 105 and UEs 115 may not distinguish between true and fabricated transmissions.

Aspects of the present disclosure describe new physical layer security enhancements by leveraging multiple beams between base stations 105 and UEs 115. For example, a base station 105 may determine to communicate with a UE 115 utilizing a set of beams. Multi-beam communication may be implemented via reflection from environmental clusters, assistance from relays, repeaters, reconfigurable intelligence surface (RIS) nodes, or some combination thereof. The base station 105 may partition a packet into multiple subpackets, where the base station 105 may assign one or more subpackets to one or more beams within the set of beams. That is, the base station 105 may split the packet across the set of beams used to communicate with the UE 115. Additionally, the base station 105 may indicate which beams correspond to which portions of the packet (e.g., to enable concatenation at the UE 115).

By splitting a packet amongst the set of beams, security and integrity associated with the packet may be enhanced. For example, while up to 64 synchronization signal block (SSB) beams may be used at the base station 105, the UE 115 may receive a subset of those SSB beams (e.g., due to a corresponding geographic location of the UE 115). In such cases, data transmitted on a UE-specific beam (e.g., or beams) may not be seen by other UEs in different geographic areas. Additionally, the base station 105 may utilize UE-specific mappings to realize multi-beam hopping to enhance security, where different subpackets may correspond to different beams of the set of beams (e.g., different subpackets may correspond to different code blocks, redundancy versions, interleaved segments such as row and column indices). In such cases, a beam mapping between a subpacket and a beam within the set of beams may enable the UE 115 to concatenate the subpackets and recover the packet of data. Additionally, such beam to subpacket mapping may be dynamically changed to enhance overall communication security.

Figure 2:
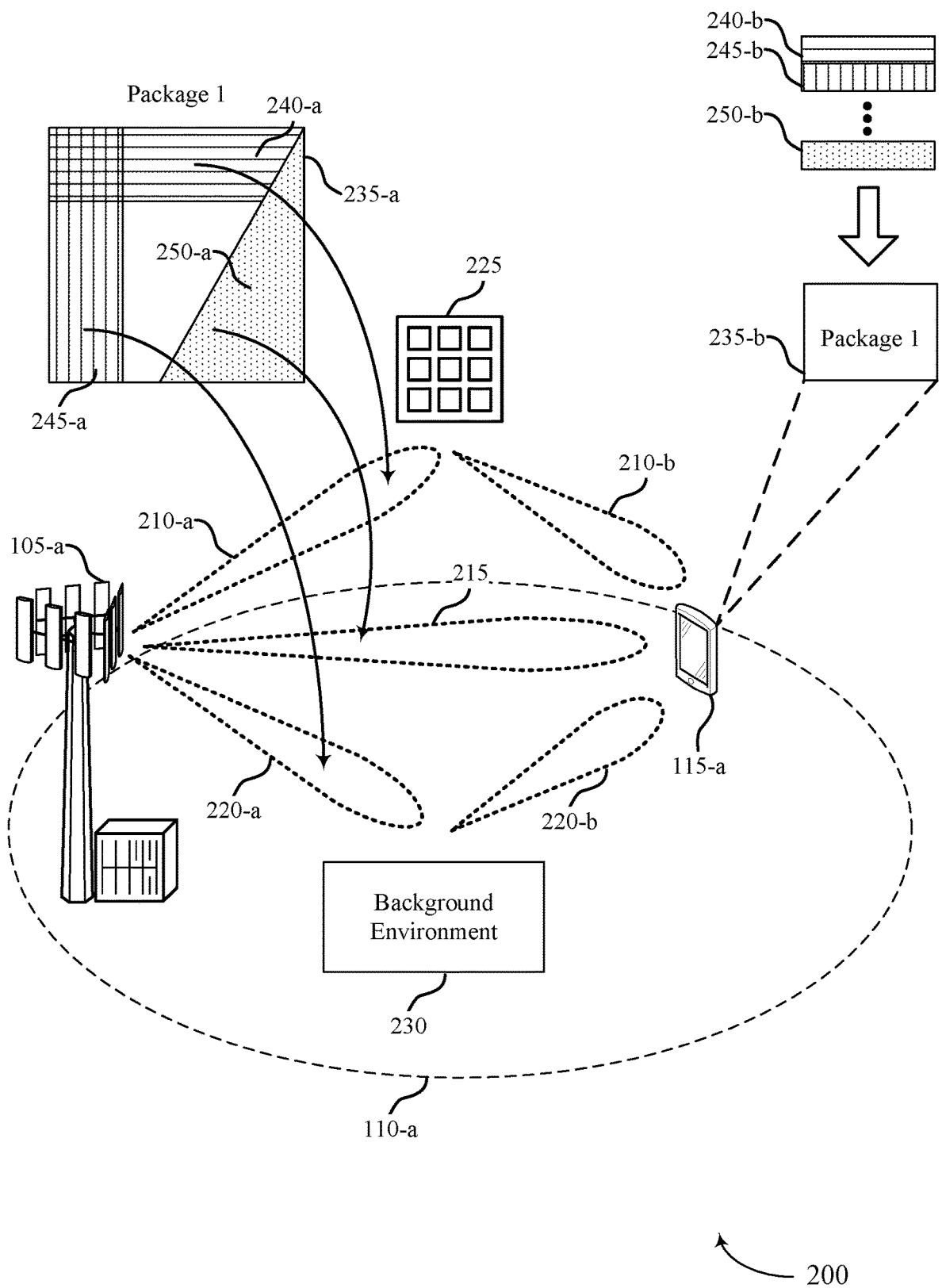

FIG. 2 illustrates an example of a wireless communications system 200 that supports multi-beam based physical layer security enhancement in accordance with aspects of the present disclosure. The wireless communications system 200 may implement or be implemented by one or more aspects of the wireless communications system 100. For example, the wireless communications system 200 may include a base station 105-a and a UE 115-a, which may be examples of a base station 105 and a UE 115 as described with reference to FIG. 1. It should be noted that, while examples are discussed below, any number of devices and device types may be used to accomplish implementations described in the present disclosure. The base station 105-a may serve a geographic coverage area 110-a, which may be an example of a geographic coverage area 110 as described with reference to FIG. 1. The wireless communications system 200 may correspond to beamformed communications.

The base station 105-a and the UE 115-a may be configured with multiple antennas, which may be used to employ techniques such as beamforming. The antennas of the base station 105-a and the UE 115-a may be located within one or more antenna arrays or antenna panels, which may support transmit or receive beamformed communication. The base station 105-a may have an antenna array with a number of rows and columns of antenna ports that the base station 105-a may use to support beamformed communication with the UE 115-a. Likewise, the UE 115-a may have one or more antenna arrays that may support various beamforming operations. The base station 105-a and the UE 115-a may thus be configured to support beamformed communication using one or multiple antennas. In some examples, the base station 105-a and the UE 115-a may be configured to support operations to manage or improve beamformed communications between the base station 105-a and the UE 115-a.

The base station 105-a may communicate with the UE 115-a over a first beam 210-a, a second beam 215, and a third beam 220-a. As illustrated in FIG. 2, the set of beams may arrive at the UE 115-a via varying paths. For example, the first beam 210-a may be redirected by a RIS 225 such that the first beam 210-a is reflected towards the UE 115-a. As such, a reflected first beam 210-b may be incident upon the UE 115-a based on the RIS 225. The second beam 215 may propagate unobstructed to the UE 115-a, while the third beam 220-a may be scattered by a background environment 230 (e.g., clusters, buildings). The background environment 230 may result in a scattered third beam 220-b, which may be received at the UE 115-a. In some examples, the first beam 210-a, the second beam 215, and the third beam 220-a may be transmitted simultaneously (e.g., under a spatial-division duplexing (SDM) or FDM scheme) or separately (e.g., under TDD). Based on the scheme utilized by the base station 105-a and the UE 115-a, one or both of the base station 105-a or the UE 115-a may determine to support multi-beam based physical layer security enhancements in accordance with aspects of the present disclosure.

For example, the base station 105-a, the UE 115-a, or both, may determine that the first beam 210-a, the second beam 215, and the third beam 220-a have adequate signaling quality (e.g., above a threshold reference signal receive power (RSRP) at the UE 115-a) to support multi-beam security at a geographic location associated with the UE 115-a. For example, the base station 105-a may determine that a group of N beams available for security enhancement may be jointly managed between the base station 105-a and the UE 115-a. For example, the UE 115-a may report N beams simultaneously in a beam report (e.g., to determine whether an RSRP associated with the N beams satisfies a threshold). The beam report may include an information element (IE) field, where the IE field may indicate a beam index, a reference signal resource index, a transmission configuration indicator (TCI) state index, or a transmit-receive point (TRP) index.

Based on the beam reporting from the UE 115-a, the base station 105-a may configure a group of N beams for secure communication. For example, the base station 105-a may map the group of N beams to a single identifier (e.g., a TCI state identifier, a resource set index), which may be UE-specific, to enable the UE 115-a to determine the N beams used for secure communication. Additionally, the UE 115-a may report a single channel state information (CSI) report (e.g., a channel quality indicator (CQI), a rank indicator (RI), a precoding matrix indicator (PMI), or some combination thereof) for the group of N beams. In some cases, the reported CSI from the UE 115-a may be utilized by the base station 105-a to determine that at least M out of the N beams may be successfully decoded at the UE 115-a.

Based on the mapping of N beams based on beam measurements between the base station 105-a and the UE 115-a, the base station 105-a may schedule a secure transmission with the UE 115-a. For example, a packet transmitted over the group of N beams (e.g., the set of beams) for enhanced security may be scheduled by a downlink control information (DCI) message. In some cases, the secure transmission may be dynamically indicated (e.g., explicitly by a new DCI field or implicitly by association with TCI states, time domain resource allocation (TDRA) table entry, HARQ ID, BWP ID, or a combination thereof). Alternatively, the secure transmission may be semi-statically configured or switched by one or more messages (e.g., MAC-CE, RRC).

Based on the mapping of the set of beams, the base station 105 may partition a packet 235-a into multiple subpackets (e.g., subpacket 240-a, subpacket 245-a, and subpacket 250-a), where the base station 105 may assign one or more subpackets to one or more beams within the set of beams. It should be noted that multiple subpackets may be assigned to a single beam, that a number of subpackets per beam may be the same or vary across different beams, or both. That is, the base station 105-a may split the packet 235-a across the first beam 210-a, the second beam 215, and the third beam 220-a, used to communicate with the UE 115-a. For example, the base station 105-a may transmit the subpacket 240-a over the first beam 210-a, the subpacket 245-a over the second beam 215, and the subpacket 250-a over the third beam 220-a. In some examples, such as when the base station 105-a utilizes SDM, FDM, or both, the base station 105-a may transmit the set of beams simultaneously. In other cases, such as when the base station 105-a utilizes TDM, the set of beams may be transmitted sequentially.

The base station 105-a may indicate which beams correspond to which portions of the packet 235-a (e.g., to enable concatenation of the packet 235-a at the UE 115-a). For example, each beam of the set of beams may be identifiable by the UE 115-a via an IE field a different beam (e.g., beam index), a reference signal (RS) resource index, a TCI state index, a TRP index, or a combination thereof. The UE 115-a may receive the reflected first beam 210-b, the second beam 215, and the scattered third beam 220-b (e.g., referred to as a set of received beams), where each beam includes a subpacket corresponding to the packet 235-a. By leveraging identifiers in each beam, the UE 115-a may reconstruct the packet 235-a based on the set of received beams. For example, the UE 115-a may determine that the reflected first beam 210-b includes a subpacket 240-b, the second beam 215 includes a second subpacket 245-b, and the scattered third beam 220-b includes a subpacket 250-b.

Based on the identifiers associated with the set of received beams, the UE 115-a may concatenate the subpackets 240-b, 245-b, and 250-b to reconstruct a packet 235-b corresponding to the packet 235-a. That is, the UE 115-a may aggregate received subpackets to reconstruct the packet 235-a transmitted from the base station 105-a. Assigning different subpackets to different beams of the set of beams may provide enhanced security since other UEs 115 may not reside within the same geographic location as the UE 115-a and therefore may not receive one or more of the first reflected beam 210-b, the second beam 215, and the scattered third beam 220-b. In some examples, however, the base station 105-a and the UE 115-a may implement additional security features with respect to transmissions. For example, the base station 105-a and the UE 115-a may implement multi-beam hopping to further enhance security. In such cases, the subpackets received at the UE 115-a may not be self-decodable. That is, a subpacket may not be decodable unless a threshold number of subpackets are received at the UE 115-a.

The subpackets may be jointly encrypted to prevent partial decodability by unintended UEs. To accomplish the prevention of partial decodability, and in addition to or instead of channel coding, the base station 105-a, the UE 115-a, or both, may utilize coding schemes, such as fountain or rateless coding schemes, for application to the packet 235-a. For example, to decode the packet 235-b, at least M out of N sub-packets may be successfully received and combined with an order indicated by one or more transmissions. In the case of FIG. 2, the UE 115-a may decode the packet 235-b if the reflected first beam 210-b, the second beam 215, and the scattered third beam 220-b are received. Conversely, if the UE 115-b receives the second beam 215, but not the reflected first beam 210-b and the scattered third beam 220-b, the UE 115-b may not decode the packet 235-b.

Figure 3:
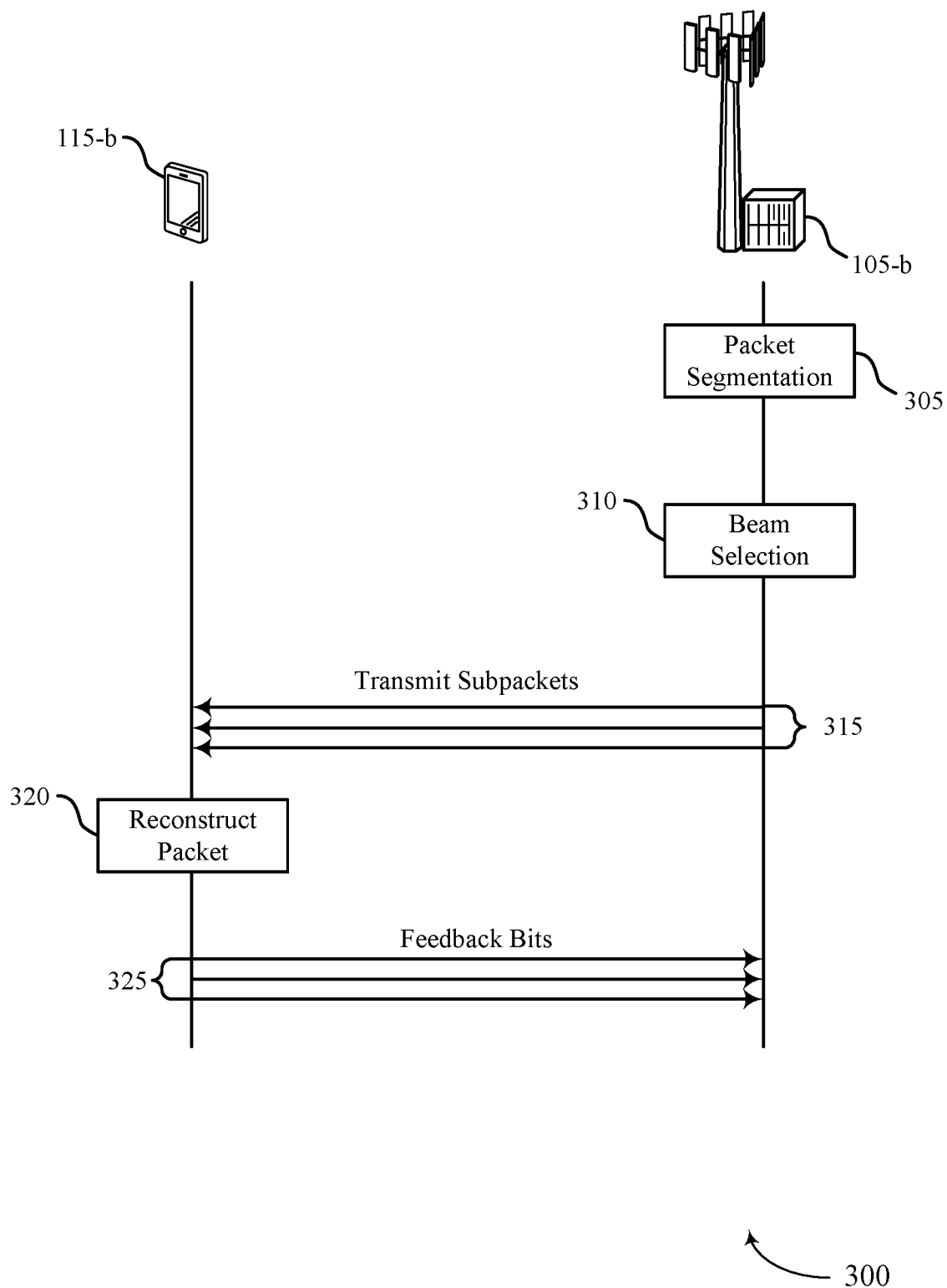
FIG. 3 illustrates an example of a process flow that supports multi-beam based physical layer security enhancement in accordance with aspects of the present disclosure.

FIG. 3 illustrates an example of a process flow 300 that supports multi-beam based physical layer security enhancement in accordance with aspects of the present disclosure. The process flow 300 may implement or be implemented by one or more aspects of the wireless communications system 100 or the wireless communications system 200. For example, the process flow 300 may correspond to communications between a base station 105-b and a UE 115-b, which may be examples of a base station 105 and a UE 115 as described with reference to FIGS. 1 and 2. In the following description of the process flow 300, operations between the base station 105-b and the UE 115-b may occur in a different order or at different times than as shown. Some operations may also be omitted from the process flow 300, and other operations may be added to the process flow 300.

At 305, the base station 105-b may segment a packet into multiple groups of subpackets (e.g., a plurality of subpackets) for beamformed communication (e.g., a multi-beam transmission). At 310, the base station 105-b may perform beam selection for the beamformed communications of the segmented packet (e.g., beamformed communications of the multiple groups of subpackets). In some examples, the base station 105-b may perform beam selection for the beamformed communications of the segmented packet based on one or both of a beam report or a number of beams for the beamformed communications. The base station 105-b may assign each group of subpackets to a respective beam of the number of beams for the beamformed communications. At 315, the base station 105-b may transmit each group of subpackets associated with the segmented packet over a respective beam of the number of beams (e.g., a set of beams). As discussed with reference to FIGS. 1 and 2, each respective beam may carry a group of subpackets and an indication of the group of subpackets. Based on the transmitted groups of subpackets, at 320, the UE 115-b may reconstruct the segmented packet. The subpackets may be jointly encrypted to prevent partial decodability by unintended UEs. To accomplish the prevention of partial decodability, and in addition to or instead of channel coding, the base station 105-b, the UE 115-b, or both, may utilize coding schemes, such as fountain or rateless coding schemes, for application to the packet. For example, to decode the packet, at least M out of N sub-packets may be successfully received and combined with an order indicated by one or more transmissions.

In some examples, one or both of the base station 105-b or the UE 115-b, may implement additional security enhancements for HARQ feedback. For example, the UE 115-b may utilize multi-beam hopping for transmitting HARQ feedback (e.g., feedback bits), where the feedback enhances security associated with communications between the UE 115-b and the base station 105-b. In such cases, HARQ feedback bits may be partitioned into multiple segments (e.g., subset of feedback bits), where each segment may be transmitted by a respective beam of a number of beams. Each segment (e.g., portions of HARQ bits) may be mapped with a beam (e.g., one segment per beam, multiple segments per beam, or both). In some cases, the mapping between one or more feedback segments and the number of beams may change to increase security for the transmission of the HARQ feedback bits.

Each HARQ segment may correspond to a partition of a HARQ codebook, an interleaved segment of the HARQ codebook, or both. At 325, the UE 115-b may transmit feedback bits to the base station 105-b in accordance with the HARQ segment to beam mapping. In such cases, the HARQ feedback may be indicated explicitly, implicitly, or both. For example, the HARQ feedback may be indicated explicitly using one or both of a physical uplink control channel (PUCCH) resource index or a physical uplink shared channel (PUSCH) resource index. The PUCCH resource for secure HARQ feedback may be associated with a sequence of beams (e.g., spatial relation, power control parameters). In some cases, with a primary rate interface (PRI) indication found in a scheduling DCI, the secure HARQ feedback may be used for the HARQ feedback for scheduled PDSCH. In other cases, HARQ feedback may be implicitly indicated. For example, the HARQ feedback may be paired with a secure PDSCH transmission. For example, if multi-beam security enhancements are used for PDSCH transmissions in downlink, the HARQ feedback for the PDSCH may also use the multi-beam based security enhancements. In such cases, the same or different sets and orders of beams as the PDSCH may be used for the HARQ feedback. In some examples, there may be a beam reciprocity for multi-beam security enhancements. For example, the base station 105-b may use a set of beams (e.g., for downlink signaling over a PDCCH or a PDSCH) and an order of beams (e.g., a first beam, a second beam, and so on). Similarly, the UE 115-b may use the same or different sets and orders of beams (e.g., for uplink signaling over a PUCCH or a PUSCH) for transmission of HARQ feedback.

Figure 4:
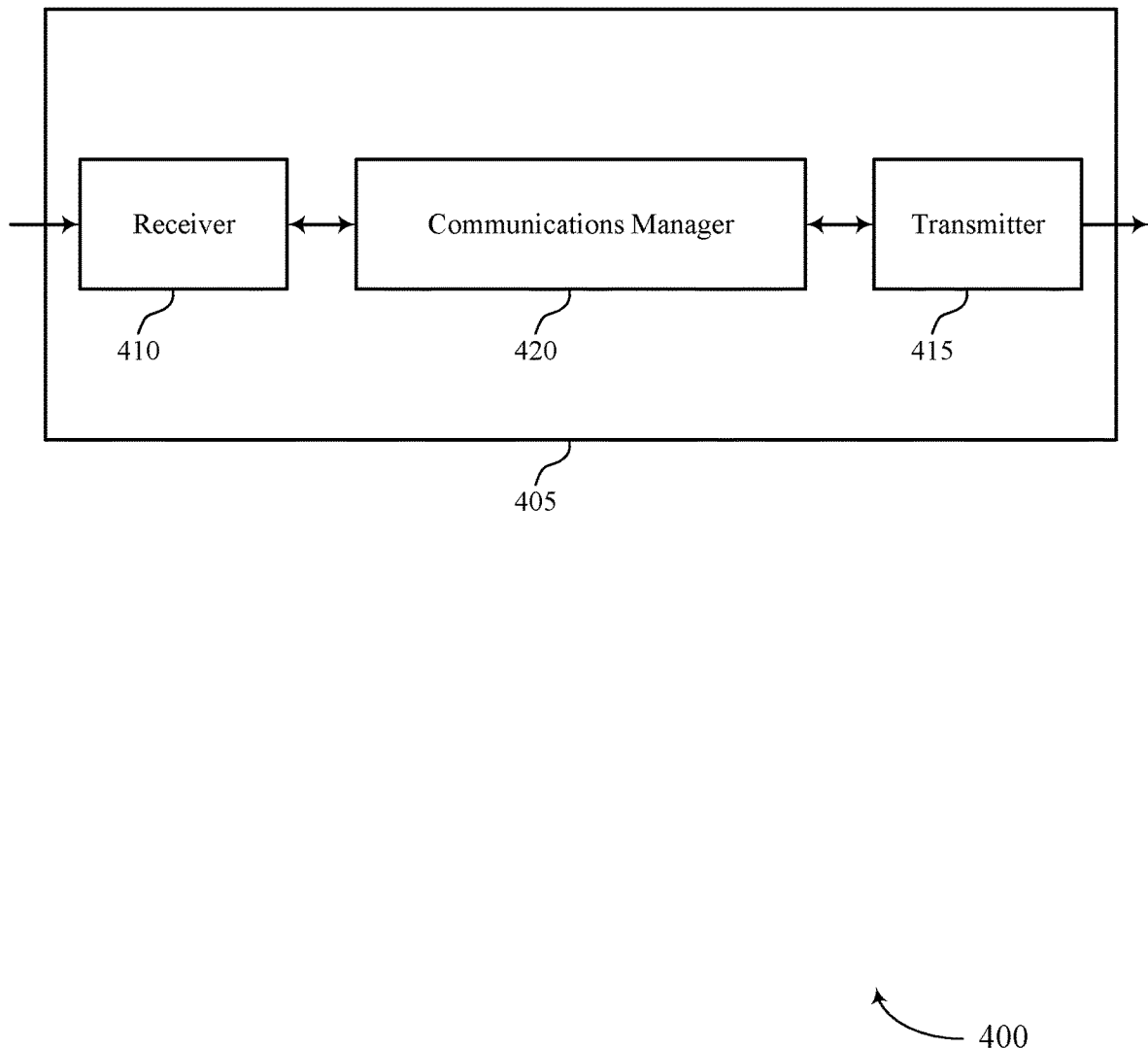
FIGS. 4 and 5 show block diagrams of devices that support multi-beam based physical layer security enhancement in accordance with aspects of the present disclosure.

FIG. 4 shows a block diagram 400 of a device 405 that supports multi-beam based physical layer security enhancement in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to multi-beam based physical layer security enhancement). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to multi-beam based physical layer security enhancement). In some examples, the transmitter 415 may be co-located with a receiver 410 in a transceiver. The transmitter 415 may utilize a single antenna or a set of multiple antennas.

The communications manager 420, the receiver 410, the transmitter 415, or various combinations thereof or various components thereof may be examples of means for performing various aspects of multi-beam based physical layer security enhancement as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at the device 405 in accordance with examples as disclosed herein. For example, the communications manager 420 may be configured as or otherwise support a means for segmenting a packet of information for a receiving device into a set of multiple subpackets. The communications manager 420 may be configured as or otherwise support a means for selecting a set of beams to use for transmission of the set of multiple subpackets. The communications manager 420 may be configured as or otherwise support a means for transmitting at least a number of subpackets of the set of multiple subpackets on a different beam of the set of beams. The communications manager 420 may be configured as or otherwise support a means for receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communications resources and reduced processing time by utilizing indicators to reconstruct mapped subpackets associated with a set of beams.

Figure 5:
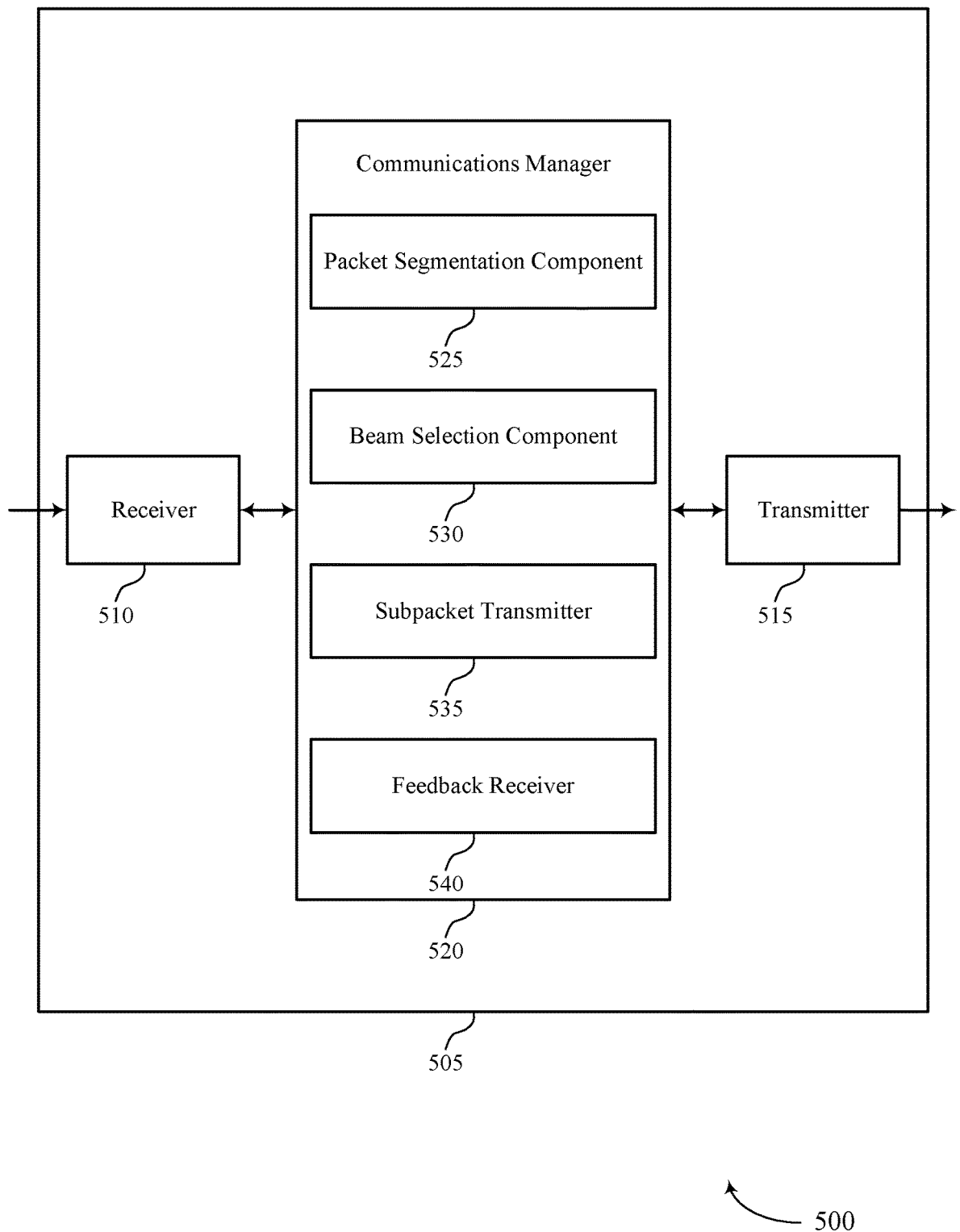

FIG. 5 shows a block diagram 500 of a device 505 that supports multi-beam based physical layer security enhancement in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-beam based physical layer security enhancement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-beam based physical layer security enhancement). In some examples, the transmitter 515 may be co-located with a receiver 510 in a transceiver. The transmitter 515 may utilize a single antenna or a set of multiple antennas.

The device 505, or various components thereof, may be an example of means for performing various aspects of multi-beam based physical layer security enhancement as described herein. For example, the communications manager 520 may include a packet segmentation component 525, a beam selection component 530, a subpacket transmitter 535, a feedback receiver 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in accordance with examples as disclosed herein. The packet segmentation component 525 may be configured as or otherwise support a means for segmenting a packet of information for a receiving device into a set of multiple subpackets. The beam selection component 530 may be configured as or otherwise support a means for selecting a set of beams to use for transmission of the set of multiple subpackets. The subpacket transmitter 535 may be configured as or otherwise support a means for transmitting at least a number of subpackets of the set of multiple subpackets on a different beam of the set of beams. The feedback receiver 540 may be configured as or otherwise support a means for receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

Figure 6:
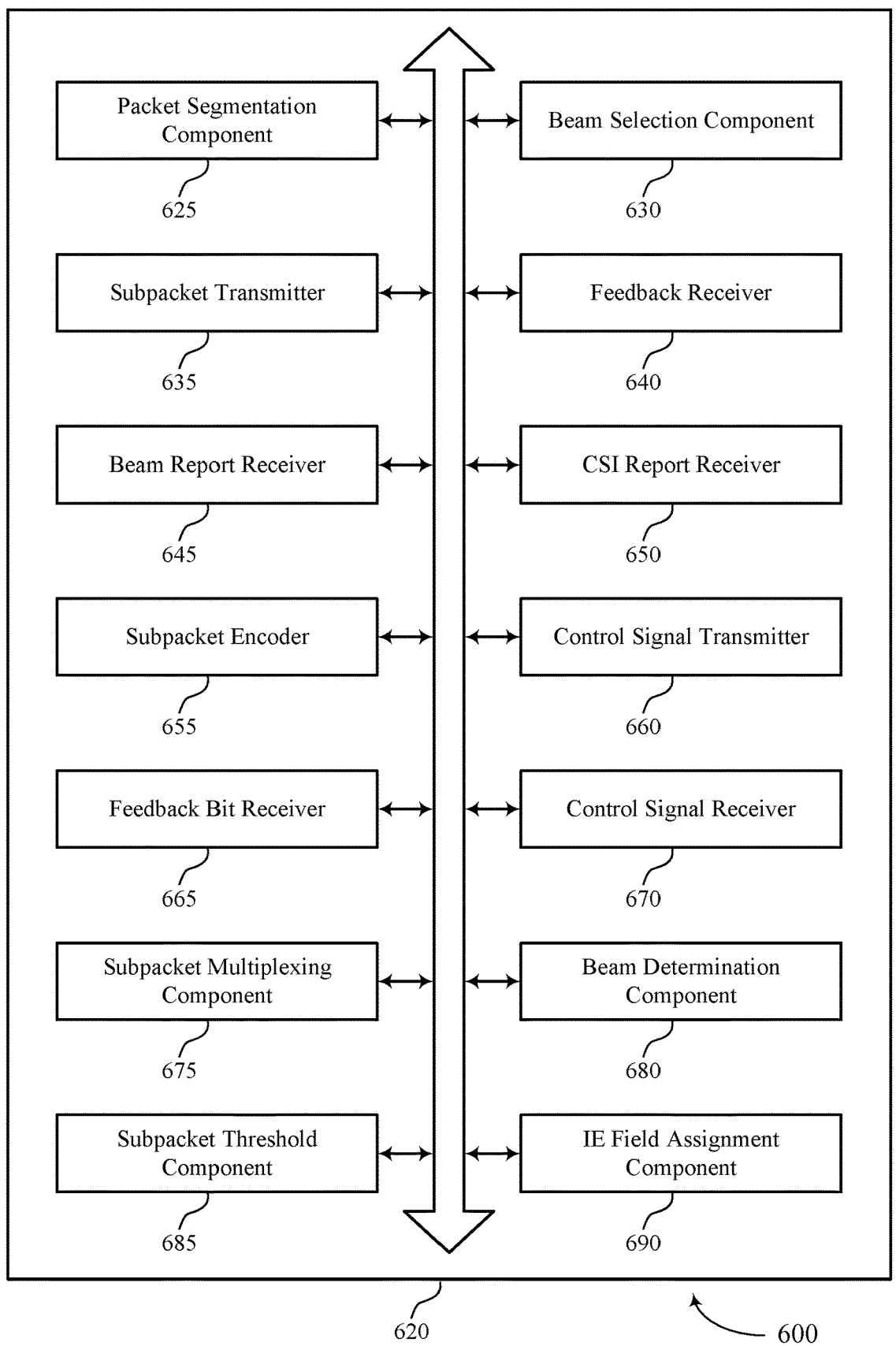
FIG. 6 shows a block diagram of a communications manager that supports multi-beam based physical layer security enhancement in accordance with aspects of the present disclosure.

FIG. 6 shows a block diagram 600 of a communications manager 620 that supports multi-beam based physical layer security enhancement in accordance with aspects of the present disclosure. The communications manager 620 may be an example of aspects of a communications manager 420, a communications manager 520, or both, as described herein. The communications manager 620, or various components thereof, may be an example of means for performing various aspects of multi-beam based physical layer security enhancement as described herein. For example, the communications manager 620 may include a packet segmentation component 625, a beam selection component 630, a subpacket transmitter 635, a feedback receiver 640, a beam report receiver 645, a CSI report receiver 650, a subpacket encoder 655, a control signal transmitter 660, a feedback bit receiver 665, a control signal receiver 670, a subpacket multiplexing component 675, a beam determination component 680, a subpacket threshold component 685, an IE field assignment component 690, or any combination thereof. Each of these components may communicate, directly or indirectly, with one another (e.g., via one or more buses).

The communications manager 620 may support wireless communication at a device in accordance with examples as disclosed herein. The packet segmentation component 625 may be configured as or otherwise support a means for segmenting a packet of information for a receiving device into a set of multiple subpackets. The beam selection component 630 may be configured as or otherwise support a means for selecting a set of beams to use for transmission of the set of multiple subpackets. The subpacket transmitter 635 may be configured as or otherwise support a means for transmitting at least a number of subpackets of the set of multiple subpackets on a different beam of the set of beams. The feedback receiver 640 may be configured as or otherwise support a means for receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

In some examples, the beam report receiver 645 may be configured as or otherwise support a means for receiving a beam report indicating the set of beams to use for the transmission of the set of multiple subpackets. In some examples, the beam selection component 630 may be configured as or otherwise support a means for selecting the set of beams to use for the transmission of the set of multiple subpackets further based on the received beam report. In some examples, the beam determination component 680 may be configured as or otherwise support a means for determining the set of beams according to an IE field of the beam report, the IE field including one or more of a beam index, a reference signal resource index, a TCI state index, or a TRP index. In some examples, the beam determination component 680 may be configured as or otherwise support a means for selecting the set of beams to use for the transmission of the set of multiple subpackets further based on determining the set of beams according to the IE field of the beam report.

In some examples, the CSI report receiver 650 may be configured as or otherwise support a means for receiving a CSI report for the set of beams, the CSI report including one or more of a CQI, an RI, or a PMI. In some examples, the beam selection component 630 may be configured as or otherwise support a means for selecting the set of beams to use for the transmission of the set of multiple subpackets further based on the CSI report for the set of beams. In some examples, the subpacket encoder 655 may be configured as or otherwise support a means for encoding the set of multiple subpackets by jointly encrypting a quantity of subpackets of the set of multiple subpackets using one or both of a coding scheme or a channel coding scheme, where each subpacket of the set of multiple subpackets is not decodable separately from other subpackets of the set of multiple subpackets based on the encoding. In some examples, the subpacket transmitter 635 may be configured as or otherwise support a means for transmitting each subpacket of the set of multiple subpackets further based on jointly encrypting the set of multiple subpackets.

In some examples, to support encoding the set of multiple subpackets, the subpacket encoder 655 may be configured as or otherwise support a means for jointly encrypting the set of multiple subpackets using one or both of a rateless coding scheme or the channel coding scheme. In some examples, the subpacket threshold component 685 may be configured as or otherwise support a means for determining a threshold quantity of subpackets for encoding the set of multiple subpackets based on a CSI report for the set of beams. In some examples, the subpacket encoder 655 may be configured as or otherwise support a means for encoding the set of multiple subpackets by jointly encrypting the quantity of subpackets of the set of multiple subpackets further based on the threshold quantity of subpackets.

In some examples, the control signal transmitter 660 may be configured as or otherwise support a means for transmitting control signaling indicating a mapping between each subpacket of the set of multiple subpackets and each beam of the set of beams, or each subset of feedback bits of the set of multiple subsets of feedback bits and each beam of the set of beams, or a combination thereof. In some examples, the feedback bit receiver 665 may be configured as or otherwise support a means for receiving each subset of feedback bits of the set of multiple subsets of feedback bits on the different beams of the set of beams further based on the mapping.

In some examples, the control signal transmitter 660 may be configured as or otherwise support a means for transmitting control signaling scheduling the set of beams to use for the transmission of the set of multiple subpackets, the control signaling including one or both of dynamic control signaling or semi-static control signaling. In some examples, the control signal transmitter 660 may be configured as or otherwise support a means for transmitting each subpacket of the set of multiple subpackets further based on transmitting the control signaling scheduling the set of beams. In some examples, the dynamic control signaling includes a DCI. In some examples, the semi-static control signaling includes one or both of a MAC-CE or an RRC message. In some examples, the control signaling indicates the transmission of the set of multiple subpackets based on an association between an IE field associated with the control signaling and the set of beams, the IE field corresponding to a TCI index, a TDRA index, a HARQ index, or a BWP index, or a combination thereof.

In some examples, the IE field assignment component 690 may be configured as or otherwise support a means for assigning an IE field associated with the control signaling to indicate the transmission of the set of multiple subpackets. In some examples, the subpacket transmitter 635 may be configured as or otherwise support a means for transmitting each subpacket of the set of multiple subpackets further based on assigning the IE field associated with the control signaling to indicate the transmission of the set of multiple subpackets. In some examples, each subset of feedback bits of the set of multiple subsets of feedback bits corresponds to one or both of a partition of a HARQ codebook or an interleaving portion of the HARQ codebook.

In some examples, the control signal receiver 670 may be configured as or otherwise support a means for receiving control signaling indicating the transmission of each subset of feedback bits of the set of multiple subsets of feedback bits on the different beams of the set of beams based on an uplink channel resource index, the uplink channel resource index including a PUCCH resource index or a physical uplink shared channel (PUSCH) resource index corresponding to the set of beams. In some examples, the feedback receiver 640 may be configured as or otherwise support a means for receiving each subset of feedback bits of the set of multiple subsets of feedback bits on the different beams of the set of beams further based on the uplink channel resource index. In some examples, the set of beams for the transmission of each subset of feedback bits of the set of multiple subsets of feedback bits is different from the set of beams for the transmission of each subpacket of the set of multiple subpackets. In some examples, different subpackets of the set of multiple subpackets correspond to different code blocks, redundancy versions, interleaving resources in one or both of a time domain or a frequency domain, or a combination thereof.

In some examples, the subpacket multiplexing component 675 may be configured as or otherwise support a means for multiplexing the set of multiple subpackets in one or more of a frequency domain, a time domain, or a spatial domain based on a FDM scheme, a TDM scheme, or a SDM scheme, or a combination thereof. In some examples, the subpacket transmitter 635 may be configured as or otherwise support a means for transmitting each subpacket of the set of multiple subpackets further based on multiplexing the set of multiple subpackets in one or more of the frequency domain, the time domain, or the spatial domain. In some examples, each beam of the set of beams corresponds to one or more of a beam index, a reference signal resource index, a TCI state index, or a TRP index. In some examples, each beam of the set of beams includes an SSB beam associated with a respective subpacket of the set of multiple subpackets. In some examples, each subset of feedback bits of the set of multiple subsets of feedback bits includes HARQ feedback bits.

Figure 7:
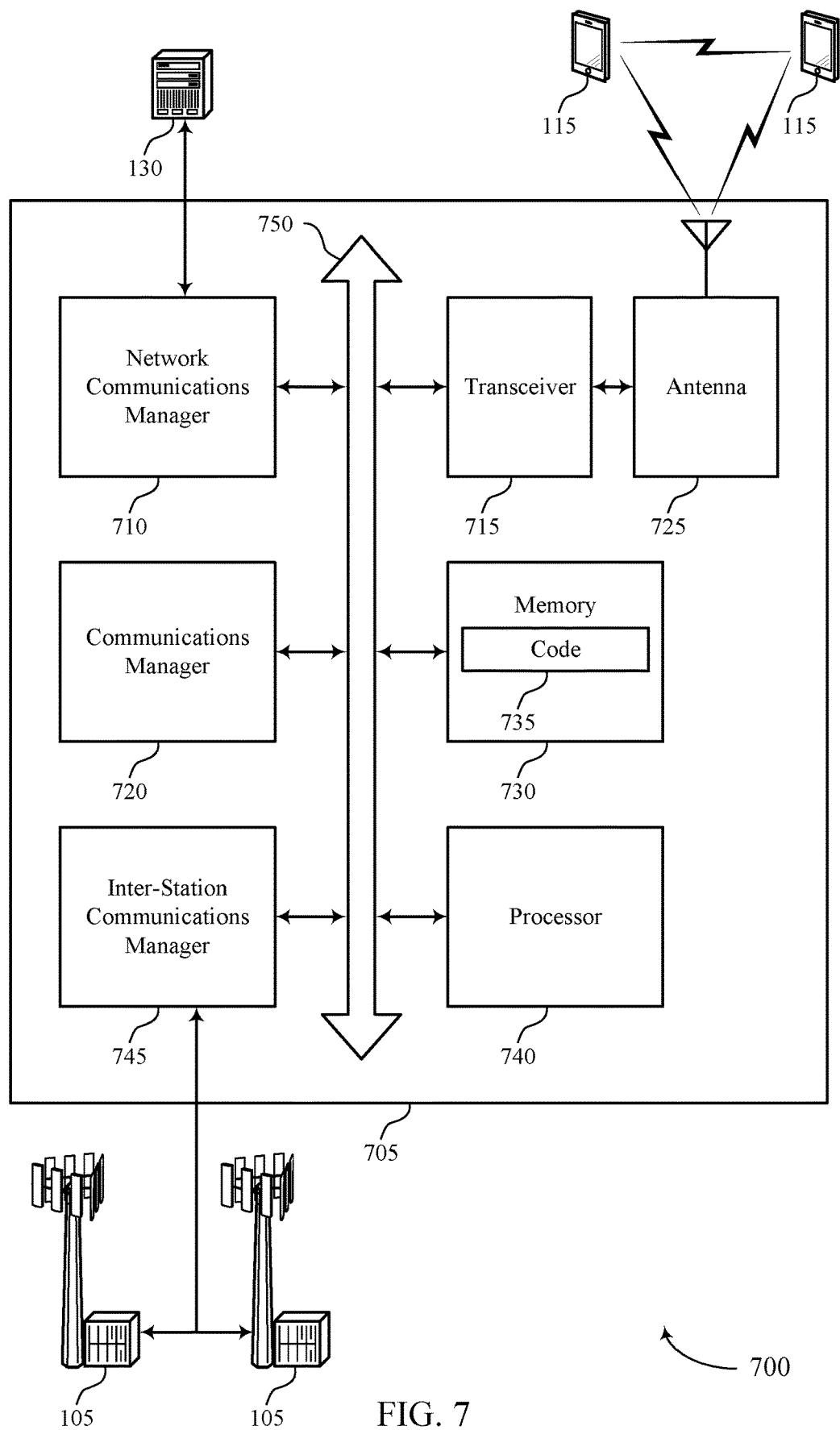
FIG. 7 shows a diagram of a system including a device that supports multi-beam based physical layer security enhancement in accordance with aspects of the present disclosure.

FIG. 7 shows a diagram of a system 700 including a device 705 that supports multi-beam based physical layer security enhancement in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting multi-beam based physical layer security enhancement). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at the device 705 in accordance with examples as disclosed herein. For example, the communications manager 720 may be configured as or otherwise support a means for segmenting a packet of information for a receiving device into a set of multiple subpackets. The communications manager 720 may be configured as or otherwise support a means for selecting a set of beams to use for transmission of the set of multiple subpackets. The communications manager 720 may be configured as or otherwise support a means for transmitting at least a number of subpackets of the set of multiple subpackets on a different beam of the set of beams. The communications manager 720 may be configured as or otherwise support a means for receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams.

By including or configuring the communications manager 720 in accordance with examples as described herein, the device 705 may support techniques for improved communication reliability, reduced latency, more efficient utilization of communication resources, improved coordination between devices, and increased communication security by segmenting subpackets across a set of beams, where individual subpackets may not be independently decodable.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of multi-beam based physical layer security enhancement as described herein, or the processor 740 and the memory 730 may be otherwise configured to perform or support such operations.

Figure 8:
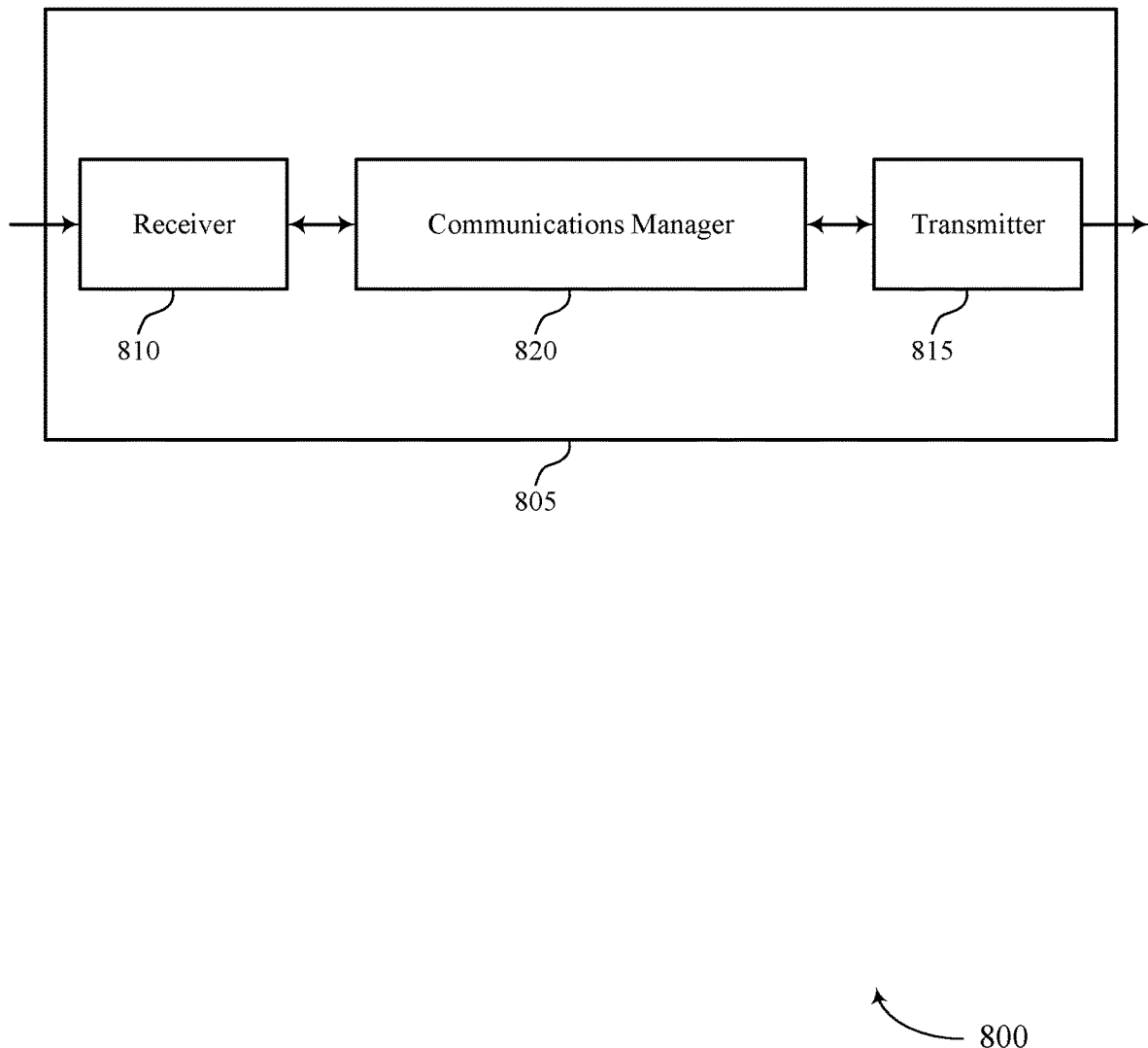
FIGS. 8 and 9 show block diagrams of devices that support multi-beam based physical layer security enhancement in accordance with aspects of the present disclosure.

FIG. 8 shows a block diagram 800 of a device 805 that supports multi-beam based physical layer security enhancement in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-beam based physical layer security enhancement). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-beam based physical layer security enhancement). In some examples, the transmitter 815 may be co-located with a receiver 810 in a transceiver. The transmitter 815 may utilize a single antenna or a set of multiple antennas.

The communications manager 820, the receiver 810, the transmitter 815, or various combinations thereof or various components thereof may be examples of means for performing various aspects of multi-beam based physical layer security enhancement as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 in accordance with examples as disclosed herein. For example, the communications manager 820 may be configured as or otherwise support a means for receiving at least a number of subpackets of a set of multiple subpackets on different beams of a set of beams. The communications manager 820 may be configured as or otherwise support a means for generating feedback based on receiving at least the number of subpackets of the set of multiple subpackets. The communications manager 820 may be configured as or otherwise support a means for segmenting the feedback into a set of multiple subsets of feedback bits. The communications manager 820 may be configured as or otherwise support a means for transmitting each subset of feedback bits of the set of multiple subsets of feedback bits on one or more beams of the set of beams.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communications resources and reduced processing time by utilizing indicators to reconstruct mapped subpackets associated with a set of beams.

Figure 9:
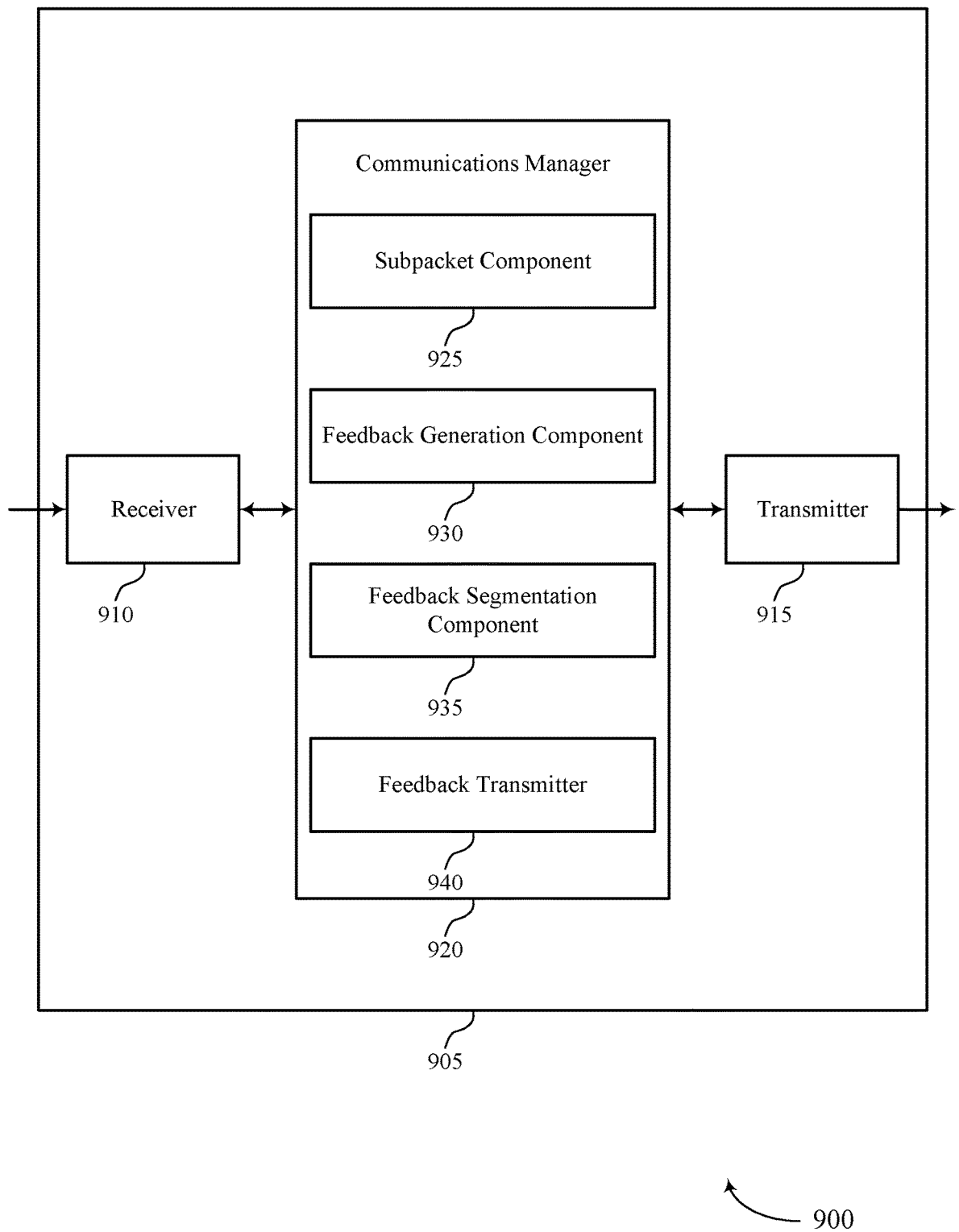

FIG. 9 shows a block diagram 900 of a device 905 that supports multi-beam based physical layer security enhancement in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multi-beam based physical layer security enhancement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multi-beam based physical layer security enhancement). In some examples, the transmitter 915 may be co-located with a receiver 910 in a transceiver. The transmitter 915 may utilize a single antenna or a set of multiple antennas.

The device 905, or various components thereof, may be an example of means for performing various aspects of multi-beam based physical layer security enhancement as described herein. For example, the communications manager 920 may include a subpacket component 925, a feedback generation component 930, a feedback segmentation component 935, a feedback transmitter 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 in accordance with examples as disclosed herein. The subpacket component 925 may be configured as or otherwise support a means for receiving at least a number of subpackets of a set of multiple subpackets on different beams of a set of beams. The feedback generation component 930 may be configured as or otherwise support a means for generating feedback based on receiving at least the number of subpackets of the set of multiple subpackets. The feedback segmentation component 935 may be configured as or otherwise support a means for segmenting the feedback into a set of multiple subsets of feedback bits. The feedback transmitter 940 may be configured as or otherwise support a means for transmitting each subset of feedback bits of the set of multiple subsets of feedback bits on one or more beams of the set of beams.

Figure 10:
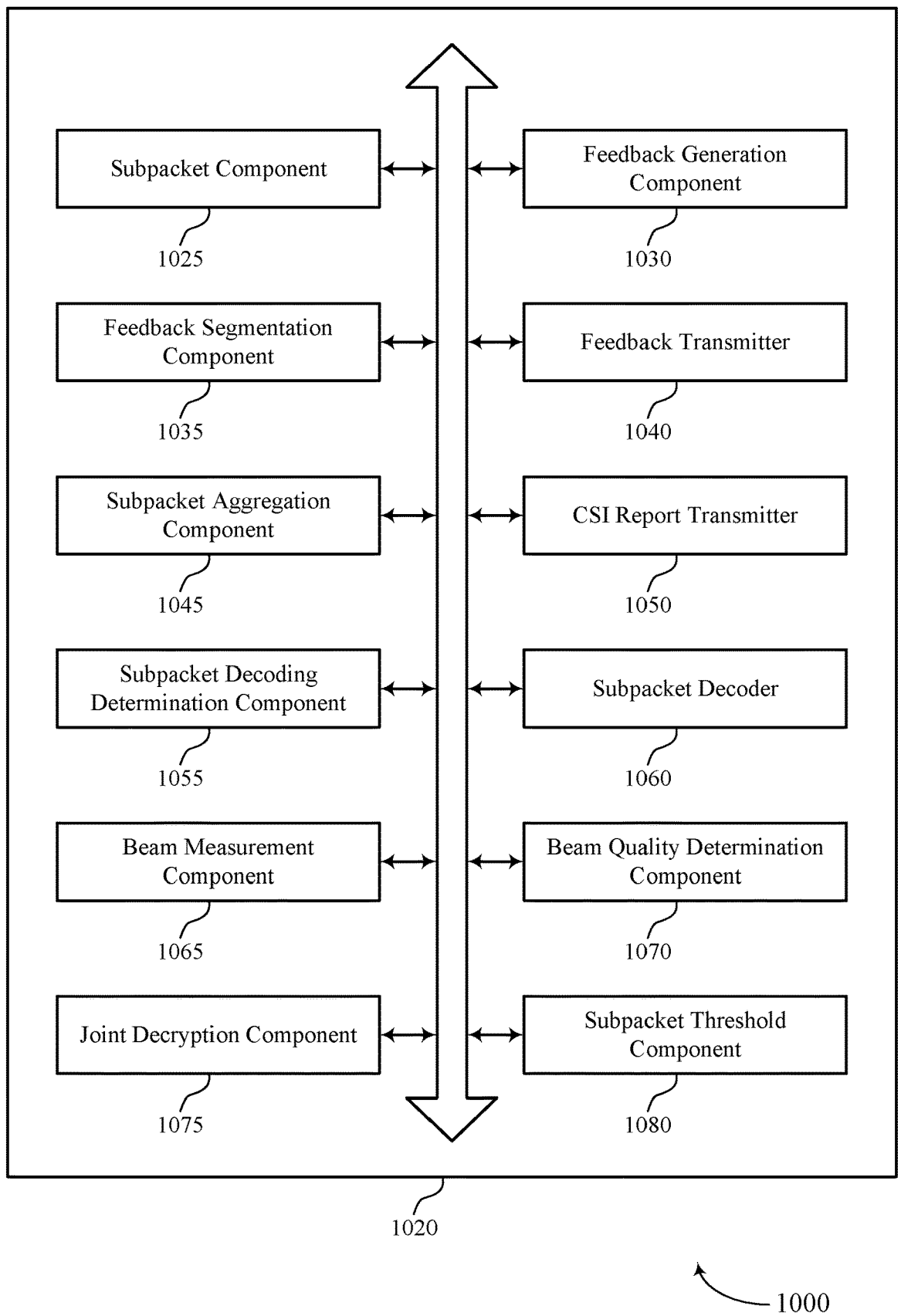
FIG. 10 shows a block diagram of a communications manager that supports multi-beam based physical layer security enhancement in accordance with aspects of the present disclosure.

FIG. 10 shows a block diagram 1000 of a communications manager 1020 that supports multi-beam based physical layer security enhancement in accordance with aspects of the present disclosure. The communications manager 1020 may be an example of aspects of a communications manager 820, a communications manager 920, or both, as described herein. The communications manager 1020, or various components thereof, may be an example of means for performing various aspects of multi-beam based physical layer security enhancement as described herein. For example, the communications manager 1020 may include a subpacket component 1025, a feedback generation component 1030, a feedback segmentation component 1035, a feedback transmitter 1040, a subpacket aggregation component 1045, a CSI report transmitter 1050, a subpacket decoding determination component 1055, a subpacket decoder 1060, a beam measurement component 1065, a beam quality determination component 1070, a joint decryption component 1075, a subpacket threshold component 1080, or any combination thereof. Each of these components may communicate, directly or indirectly, with one another (e.g., via one or more buses).

The communications manager 1020 may support wireless communication at a device in accordance with examples as disclosed herein. The subpacket component 1025 may be configured as or otherwise support a means for receiving at least a number of subpackets of a set of multiple subpackets on different beams of a set of beams. The feedback generation component 1030 may be configured as or otherwise support a means for generating feedback based on receiving at least the number of subpackets of the set of multiple subpackets. The feedback segmentation component 1035 may be configured as or otherwise support a means for segmenting the feedback into a set of multiple subsets of feedback bits. The feedback transmitter 1040 may be configured as or otherwise support a means for transmitting each subset of feedback bits of the set of multiple subsets of feedback bits on one or more beams of the set of beams.

In some examples, the subpacket aggregation component 1045 may be configured as or otherwise support a means for aggregating the set of multiple subpackets to form a packet based on receiving each subpacket of the set of multiple subpackets on the different beams of the set of beams. In some examples, the feedback generation component 1030 may be configured as or otherwise support a means for transmitting a beam report indicating the set of beams to use for transmission of the set of multiple subpackets. In some examples, the subpacket component 1025 may be configured as or otherwise support a means for receiving each subpacket of the set of multiple subpackets on the different beams of the set of beams is further based on the transmitted beam report. In some examples, the CSI report transmitter 1050 may be configured as or otherwise support a means for transmitting a CSI report for the set of beams, the CSI report including one or more of a CQI, an RI, or a PMI. In some examples, the subpacket component 1025 may be configured as or otherwise support a means for receiving each subpacket of the set of multiple subpackets on the different beams of the set of beams further based on the CSI report for the set of beams.

In some examples, the subpacket decoding determination component 1055 may be configured as or otherwise support a means for determining that each subpacket of the set of multiple subpackets is not decodable separately from other subpackets of the set of multiple subpackets. In some examples, the subpacket decoder 1060 may be configured as or otherwise support a means for decoding the set of multiple subpackets by jointly decrypting a quantity of subpackets of the set of multiple subpackets using one or both of a coding scheme or a channel coding scheme. In some examples, the subpacket component 1025 may be configured as or otherwise support a means for receiving each subpacket of the set of multiple subpackets further based on jointly encrypting the set of multiple subpackets. In some examples, to support decoding the set of multiple subpackets, the joint decryption component 1075 may be configured as or otherwise support a means for jointly decrypting the set of multiple subpackets using one or both of a rateless coding scheme or the channel coding scheme.

In some examples, the subpacket threshold component 1080 may be configured as or otherwise support a means for determining a threshold quantity of subpackets for decoding the set of multiple subpackets based on a CSI report for the set of beams. In some examples, the joint decryption component 1075 may be configured as or otherwise support a means for decoding the set of multiple subpackets by jointly decrypting the quantity of subpackets of the set of multiple subpackets further based on the threshold quantity of subpackets. In some examples, the beam measurement component 1065 may be configured as or otherwise support a means for performing a beam measurement on each beam of the set of beams. In some examples, the beam quality determination component 1070 may be configured as or otherwise support a means for determining a beam quality for each beam of the set of beams based on the performed beam measurement, the beam quality corresponding to RSRP value for each beam of the set of beams. In some examples, the subpacket component 1025 may be configured as or otherwise support a means for receiving each subpacket of the set of multiple subpackets on the different beams of the set of beams further based on the determined beam quality for each beam of the set of beams.

Figure 11:
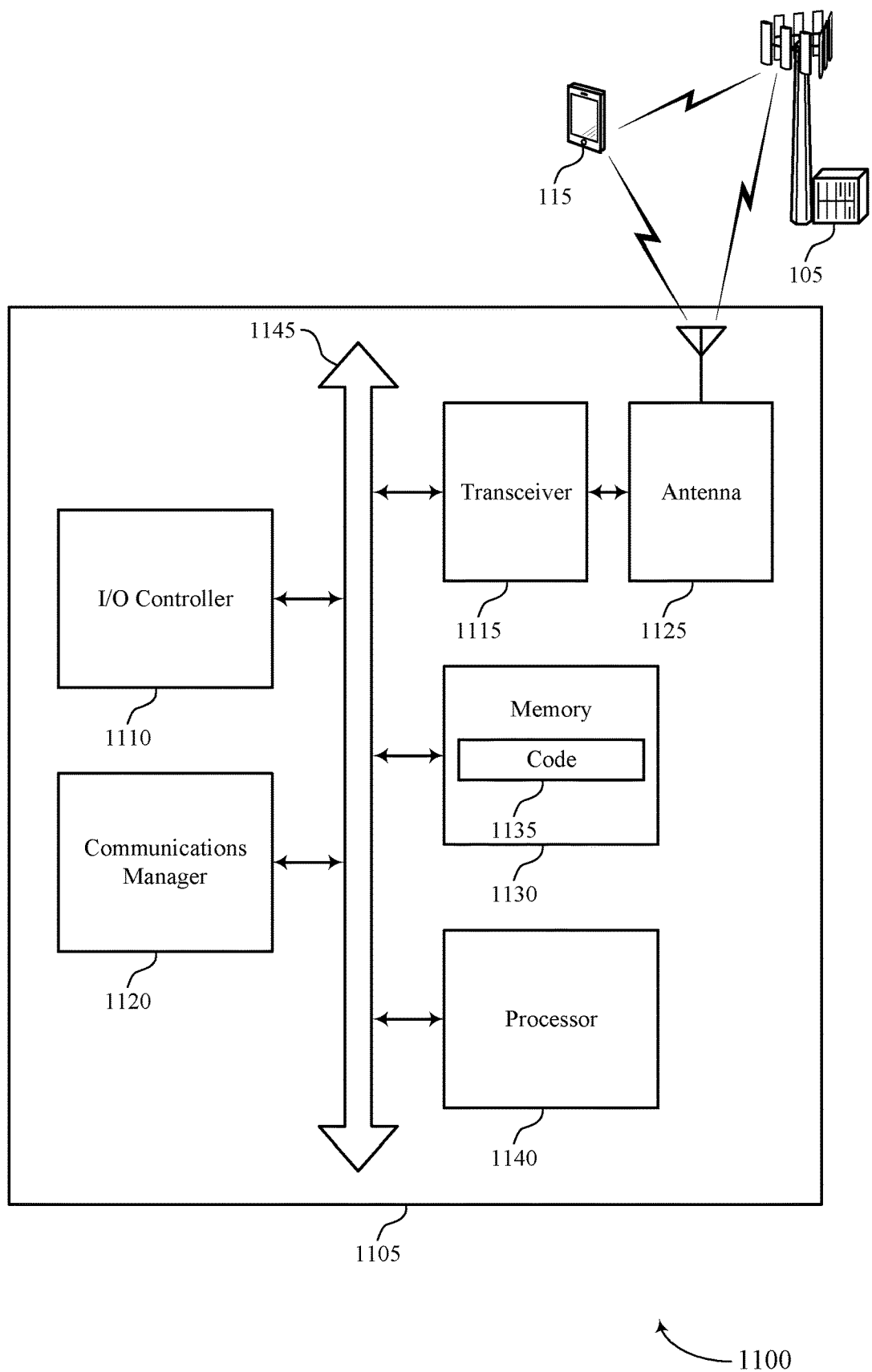
FIG. 11 shows a diagram of a system including a device that supports multi-beam based physical layer security enhancement in accordance with aspects of the present disclosure.

FIG. 11 shows a diagram of a system 1100 including a device 1105 that supports multi-beam based physical layer security enhancement in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multi-beam based physical layer security enhancement). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at the device 1105 in accordance with examples as disclosed herein. For example, the communications manager 1120 may be configured as or otherwise support a means for receiving at least a number of subpackets of a set of multiple subpackets on different beams of a set of beams. The communications manager 1120 may be configured as or otherwise support a means for generating feedback based on receiving at least the number of subpackets of the set of multiple subpackets. The communications manager 1120 may be configured as or otherwise support a means for segmenting the feedback into a set of multiple subsets of feedback bits. The communications manager 1120 may be configured as or otherwise support a means for transmitting each subset of feedback bits of the set of multiple subsets of feedback bits on one or more beams of the set of beams.

By including or configuring the communications manager 1120 in accordance with examples as described herein, the device 1105 may support techniques for improved communication reliability, reduced latency, more efficient utilization of communication resources, improved coordination between devices, and increased communication security by segmenting subpackets across a set of beams, where individual subpackets may not be independently decodable.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multi-beam based physical layer security enhancement as described herein, or the processor 1140 and the memory 1130 may be otherwise configured to perform or support such operations.

Figure 12:
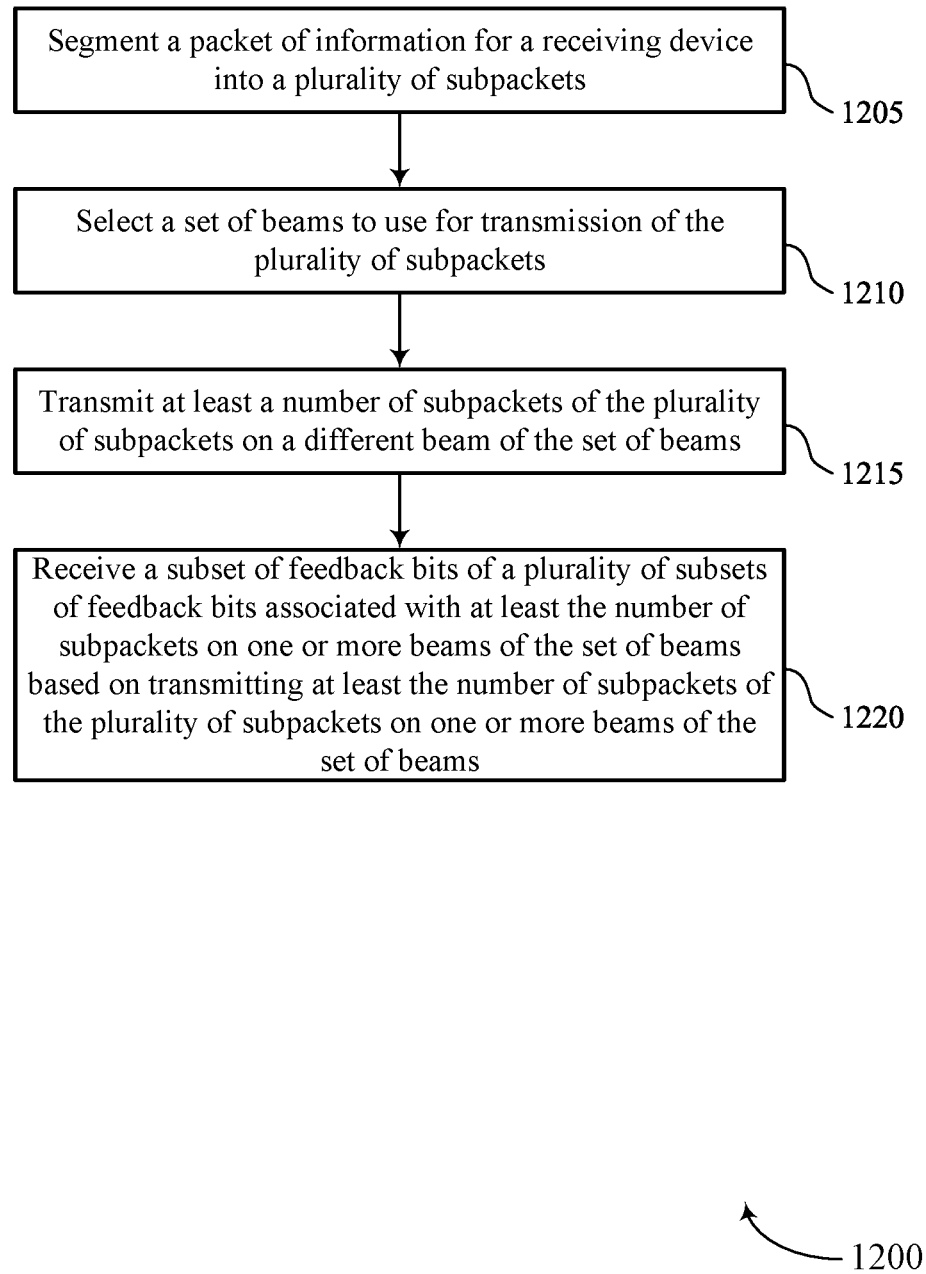
FIGS. 12 and 13 show flowcharts illustrating methods that support multi-beam based physical layer security enhancement in accordance with aspects of the present disclosure.

FIG. 12 shows a flowchart illustrating a method 1200 that supports multi-beam based physical layer security enhancement in accordance with aspects of the present disclosure. The operations of the method 1200 may be implemented by a base station or its components as described herein. For example, the operations of the method 1200 may be performed by a base station as described with reference to FIGS. 1 through 7. In some examples, a base station may execute a set of instructions to control the functional elements of the base station to perform the described functions. Additionally or alternatively, a base station may perform aspects of the described functions using special-purpose hardware.

At 1205, the method may include segmenting a packet of information for a receiving device into a set of multiple subpackets. The operations of 1205 may be performed in accordance with examples as disclosed herein. In some examples, aspects of the operations of 1205 may be performed by a packet segmentation component 625 as described with reference to FIG. 6.

At 1210, the method may include selecting a set of beams to use for transmission of the set of multiple subpackets. The operations of 1210 may be performed in accordance with examples as disclosed herein. In some examples, aspects of the operations of 1210 may be performed by a beam selection component 630 as described with reference to FIG. 6.

At 1215, the method may include transmitting at least a number of subpackets of the set of multiple subpackets on a different beam of the set of beams. The operations of 1215 may be performed in accordance with examples as disclosed herein. In some examples, aspects of the operations of 1215 may be performed by a subpacket transmitter 635 as described with reference to FIG. 6.

At 1220, the method may include receiving a subset of feedback bits of a set of multiple subsets of feedback bits associated with at least the number of subpackets on one or more beams of the set of beams based on transmitting at least the number of subpackets of the set of multiple subpackets on one or more beams of the set of beams. The operations of 1220 may be performed in accordance with examples as disclosed herein. In some examples, aspects of the operations of 1220 may be performed by a feedback receiver 640 as described with reference to FIG. 6.

Figure 13:
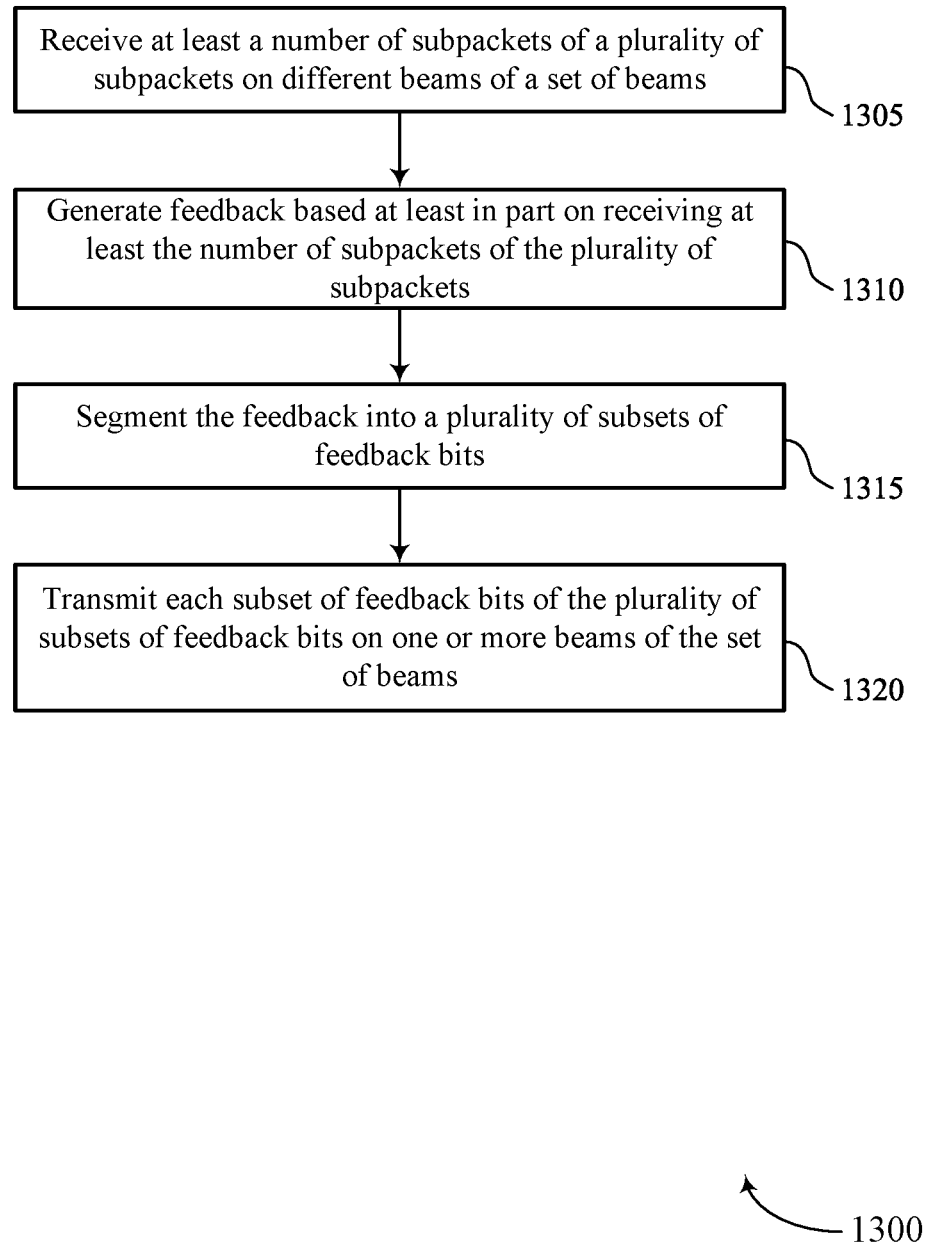

FIG. 13 shows a flowchart illustrating a method 1300 that supports multi-beam based physical layer security enhancement in accordance with aspects of the present disclosure. The operations of the method 1300 may be implemented by a UE or its components as described herein. For example, the operations of the method 1300 may be performed by a UE as described with reference to FIGS. 1 through 3 and 8 through 11. In some examples, a UE may execute a set of instructions to control the functional elements of the UE to perform the described functions. Additionally or alternatively, a UE may perform aspects of the described functions using special-purpose hardware.

At 1305, the method may include receiving at least a number of subpackets of a set of multiple subpackets on different beams of a set of beams. The operations of 1305 may be performed in accordance with examples as disclosed herein. In some examples, aspects of the operations of 1305 may be performed by a subpacket component 1025 as described with reference to FIG. 10.

At 1310, the method may include generating feedback based on receiving at least the number of subpackets of the set of multiple subpackets. The operations of 1310 may be performed in accordance with examples as disclosed herein. In some examples, aspects of the operations of 1310 may be performed by a feedback generation component 1030 as described with reference to FIG. 10.

At 1315, the method may include segmenting the feedback into a set of multiple subsets of feedback bits. The operations of 1315 may be performed in accordance with examples as disclosed herein. In some examples, aspects of the operations of 1315 may be performed by a feedback segmentation component 1035 as described with reference to FIG. 10.

At 1320, the method may include transmitting each subset of feedback bits of the set of multiple subsets of feedback bits on one or more beams of the set of beams. The operations of 1320 may be performed in accordance with examples as disclosed herein. In some examples, aspects of the operations of 1320 may be performed by a feedback transmitter 1040 as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a device, comprising: segmenting a packet of information for a receiving device into a plurality of subpackets; selecting a set of beams to use for transmission of the plurality of subpackets; transmitting at least a number of subpackets of the plurality of subpackets on a different beam of the set of beams; and receiving a subset of feedback bits of a plurality of subsets of feedback bits associated with at least the number of subpackets on one or more beams of the set of beams based at least in part on transmitting at least the number of subpackets of the plurality of subpackets on one or more beams of the set of beams.

Aspect 2: The method of aspect 1, further comprising: receiving a beam report indicating the set of beams to use for the transmission of the plurality of subpackets, wherein selecting the set of beams to use for the transmission of the plurality of subpackets is further based at least in part on the received beam report.

Aspect 3: The method of aspect 2, further comprising: determining the set of beams according to an IE field of the beam report, the IE field comprising one or more of a beam index, a reference signal resource index, a TCI state index, or a TRP index, wherein selecting the set of beams to use for the transmission of the plurality of subpackets is further based at least in part on determining the set of beams according to the IE field of the beam report.

Aspect 4: The method of any of aspects 1 through 3, further comprising: receiving a CSI report for the set of beams, the CSI report comprising one or more of a CQI, a RI, or a PMI, wherein selecting the set of beams to use for the transmission of the plurality of subpackets is further based at least in part on the CSI report for the set of beams.

Aspect 5: The method of any of aspects 1 through 4, further comprising: encoding the plurality of subpackets by jointly encrypting a quantity of subpackets of the plurality of subpackets using one or both of a coding scheme or a channel coding scheme, wherein each subpacket of the plurality of subpackets is not decodable separately from other subpackets of the plurality of subpackets based at least in part on the encoding, wherein transmitting at least the number of subpackets of the plurality of subpackets is further based at least in part on jointly encrypting the plurality of subpackets.

Aspect 6: The method of aspect 5, wherein encoding the plurality of subpackets comprises: jointly encrypting the plurality of subpackets using one or both of a rateless coding scheme or the channel coding scheme.

Aspect 7: The method of any of aspects 5 through 6, further comprising: determining a threshold quantity of subpackets for encoding the plurality of subpackets based at least in part on a CSI report for the set of beams, wherein encoding the plurality of subpackets by jointly encrypting the quantity of subpackets of the plurality of subpackets is further based at least in part on the threshold quantity of subpackets.

Aspect 8: The method of any of aspects 1 through 7, further comprising: transmitting control signaling indicating a mapping between each subpacket of the plurality of subpackets and each beam of the set of beams, or each subset of feedback bits of the plurality of subsets of feedback bits and each beam of the set of beams, or a combination thereof, wherein receiving the subset of feedback bits of the plurality of subsets of feedback bits on the different beams of the set of beams is further based at least in part on the mapping.

Aspect 9: The method of any of aspects 1 through 8, further comprising: transmitting control signaling scheduling the set of beams to use for the transmission of the plurality of subpackets, the control signaling comprising one or both of dynamic control signaling or semi-static control signaling, wherein transmitting at least the number of subpackets of the plurality of subpackets is further based at least in part on transmitting the control signaling scheduling the set of beams.

Aspect 10: The method of aspect 9, wherein the dynamic control signaling comprises a DCI, and the MAC-CE access control-control element or a RRC message.

Aspect 11: The method of any of aspects 9 through 10, wherein the control signaling indicates the transmission of the plurality of subpackets based at least in part on an association between an IE field associated with the control signaling and the set of beams, the IE field corresponding to a TCI index, a TDRA index, a HARQ index, or a bandwidth part index, or a combination thereof.

Aspect 12: The method of any of aspects 9 through 11, further comprising: assigning an IE field associated with the control signaling to indicate the transmission of the plurality of subpackets, wherein transmitting at least the number of subpackets of the plurality of subpackets is further based at least in part on assigning the IE field associated with the control signaling to indicate the transmission of the plurality of subpackets.

Aspect 13: The method of any of aspects 1 through 12, wherein each subset of feedback bits of the plurality of subsets of feedback bits corresponds to one or both of a partition of a HARQ codebook or an interleaving portion of the HARQ codebook.

Aspect 14: The method of any of aspects 1 through 13, further comprising: receiving control signaling indicating the transmission of each subset of feedback bits of the plurality of subsets of feedback bits on the different beams of the set of beams based at least in part on an uplink channel resource index, the uplink channel resource index comprising a physical uplink control channel resource index or a physical uplink shared channel resource index corresponding to the set of beams, wherein receiving the subset of feedback bits of the plurality of subsets of feedback bits on the different beams of the set of beams is further based at least in part on the uplink channel resource index.

Aspect 15: The method of aspect 14, wherein the set of beams for the transmission of each subset of feedback bits of the plurality of subsets of feedback bits is different from the set of beams for the transmission of each subpacket of the plurality of subpackets.

Aspect 16: The method of any of aspects 1 through 15, wherein different subpackets of the plurality of subpackets correspond to different code blocks, redundancy versions, interleaving resources in one or both of a time domain or a frequency domain, or a combination thereof.

Aspect 17: The method of any of aspects 1 through 16, further comprising: multiplexing the plurality of subpackets in one or more of a frequency domain, a time domain, or a spatial domain based at least in part on a FDM scheme, a TDM scheme, or a SDM scheme, or a combination thereof, wherein transmitting at least the number of subpackets of the plurality of subpackets is further based at least in part on multiplexing the plurality of subpackets in one or more of the frequency domain, the time domain, or the spatial domain.

Aspect 18: The method of any of aspects 1 through 17, wherein each beam of the set of beams corresponds to one or more of a beam index, a reference signal resource index, a TCI state index, or a TRP index.

Aspect 19: The method of any of aspects 1 through 18, wherein each beam of the set of beams comprises a SSB beam associated with a respective subpacket of the plurality of subpackets.

Aspect 20: The method of any of aspects 1 through 19, wherein each subset of feedback bits of the plurality of subsets of feedback bits comprises HARQ feedback bits.

Aspect 21: The method of any of aspects 1 through 20, wherein a first order of beams of the set of beams used for transmission of the plurality of subpackets is different than a second order of beams of the one or more beams used to transmit the subset of feedback bits.

Aspect 22: A method for wireless communication at a device, comprising: receiving at least a number of subpacket of a plurality of subpackets on different beams of a set of beams; generating feedback based at least in part on receiving at least the number of subpackets of the plurality of subpackets; segmenting the feedback into a plurality of subsets of feedback bits; and transmitting each subset of feedback bits of the plurality of subsets of feedback bits on one or more beams of the set of beams.

Aspect 23: The method of aspect 22, further comprising: aggregating the plurality of subpackets to form a packet based at least in part on receiving each subpacket of the plurality of subpackets on the different beams of the set of beams.

Aspect 24: The method of any of aspects 22 through 23, further comprising: transmitting a beam report indicating the set of beams to use for transmission of the plurality of subpackets, wherein receiving at least the number of subpackets of the plurality of subpackets on the different beams of the set of beams is further based at least in part on the transmitted beam report.

Aspect 25: The method of any of aspects 22 through 24, further comprising: transmitting a CSI report for the set of beams, the CSI report comprising one or more of a CQI, a RI, or a PMI, wherein receiving at least the number of subpackets of the plurality of subpackets on the different beams of the set of beams is further based at least in part on the CSI report for the set of beams.

Aspect 26: The method of any of aspects 22 through 25, further comprising: determining that each subpacket of the plurality of subpackets is not decodable separately from other subpackets of the plurality of subpackets; and decoding the plurality of subpackets by jointly decrypting a quantity of subpackets of the plurality of subpackets using one or both of a coding scheme or a channel coding scheme, wherein receiving at least the number of subpackets of the plurality of subpackets is further based at least in part on jointly encrypting the plurality of subpackets.

Aspect 27: The method of aspect 26, wherein decoding the plurality of subpackets comprises: jointly decrypting the plurality of subpackets using one or both of a rateless coding scheme or the channel coding scheme.

Aspect 28: The method of any of aspects 26 through 27, further comprising: determining a threshold quantity of subpackets for decoding the plurality of subpackets based at least in part on a CSI report for the set of beams, wherein decoding the plurality of subpackets by jointly decrypting the quantity of subpackets of the plurality of subpackets is further based at least in part on the threshold quantity of subpackets.

Aspect 29: The method of any of aspects 22 through 28, further comprising: performing a beam measurement on each beam of the set of beams; determining a beam quality for each beam of the set of beams based at least in part on the performed beam measurement, the beam quality corresponding to RSRP value for each beam of the set of beams, wherein receiving at least the number of subpackets of the plurality of subpackets on the different beams of the set of beams is further based at least in part on the determined beam quality for each beam of the set of beams.

Aspect 30: An apparatus for wireless communication at a device, comprising a processor; memory coupled with the processor; and instructions stored in the memory and executable by the processor to cause the apparatus to perform a method of any of aspects 1 through 21.

Aspect 31: An apparatus for wireless communication at a device, comprising at least one means for performing a method of any of aspects 1 through 21.

Aspect 32: A non-transitory computer-readable medium storing code for wireless communication at a device, the code comprising instructions executable by a processor to perform a method of any of aspects 1 through 21.

Aspect 33: An apparatus for wireless communication at a device, comprising a processor; memory coupled with the processor; and instructions stored in the memory and executable by the processor to cause the apparatus to perform a method of any of aspects 22 through 29.

Aspect 34: An apparatus for wireless communication at a device, comprising at least one means for performing a method of any of aspects 22 through 29.

Aspect 35: A non-transitory computer-readable medium storing code for wireless communication at a device, the code comprising instructions executable by a processor to perform a method of any of aspects 22 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   a processor;
   memory coupled with the processor; and
   instructions stored in the memory and executable by the processor to cause the apparatus to:
      segment a packet of information for a receiving device into a plurality of subpackets;
      select a set of beams to use for transmission of the plurality of subpackets;
      transmit at least a number of subpackets of the plurality of subpackets on a different beam of the set of beams; and
      receive a subset of feedback bits of a plurality of subsets of feedback bits associated with at least the number of subpackets on one or more beams of the set of beams based at least in part on transmitting at least the number of subpackets of the plurality of subpackets on one or more beams of the set of beams.

2. The apparatus of claim 1, wherein the instructions are further executable by the processor to cause the apparatus to:
   receive a beam report indicating the set of beams to use for the transmission of the plurality of subpackets,
   wherein to select the set of beams to use for the transmission of the plurality of subpackets is further based at least in part on the received beam report.

3. The apparatus of claim 2, wherein the instructions are further executable by the processor to cause the apparatus to:
   determine the set of beams according to an information element field of the beam report, the information element field comprising one or more of a beam index, a reference signal resource index, a transmission configuration indicator state index, or a transmit-receive point index,
   wherein to select the set of beams to use for the transmission of the plurality of subpackets is further based at least in part on determining the set of beams according to the information element field of the beam report.

4. The apparatus of claim 1, wherein the instructions are further executable by the processor to cause the apparatus to:
   receive a channel state information report for the set of beams, the channel state information report comprising one or more of a channel quality indicator, a rank indicator, or a precoding matrix indicator,
   wherein to select the set of beams to use for the transmission of the plurality of subpackets is further based at least in part on the channel state information report for the set of beams.

5. The apparatus of claim 1, wherein the instructions are further executable by the processor to cause the apparatus to:
   encode the plurality of subpackets by jointly encrypting a quantity of subpackets of the plurality of subpackets using one or both of a coding scheme or a channel coding scheme, wherein each subpacket of the plurality of subpackets is not decodable separately from other subpackets of the plurality of subpackets based at least in part on the encoding,
   wherein to transmit at least the number of subpackets of the plurality of subpackets is further based at least in part on jointly encrypting the plurality of subpackets.

6. The apparatus of claim 5, wherein the instructions to encode the plurality of subpackets are executable by the processor to cause the apparatus to:
   jointly encrypt the plurality of subpackets using one or both of a rateless coding scheme or the channel coding scheme.

7. The apparatus of claim 5, wherein the instructions are further executable by the processor to cause the apparatus to:
   determine a threshold quantity of subpackets for encoding the plurality of subpackets based at least in part on a channel state information report for the set of beams,
   wherein to encode the plurality of subpackets by jointly encrypting the quantity of subpackets of the plurality of subpackets is further based at least in part on the threshold quantity of subpackets.

8. The apparatus of claim 1, wherein the instructions are further executable by the processor to cause the apparatus to:
   transmit control signaling indicating a mapping between each subpacket of the plurality of subpackets and each beam of the set of beams, or each subset of feedback bits of the plurality of subsets of feedback bits and each beam of the set of beams, or a combination thereof,
   wherein to receive the subset of feedback bits of the plurality of subsets of feedback bits on the different beams of the set of beams is further based at least in part on the mapping.

9. The apparatus of claim 1, wherein the instructions are further executable by the processor to cause the apparatus to:
   transmit control signaling scheduling the set of beams to use for the transmission of the plurality of subpackets, the control signaling comprising one or both of dynamic control signaling or semi-static control signaling, wherein to transmit at least the number of subpackets of the plurality of subpackets is further based at least in part on transmitting the control signaling scheduling the set of beams.

10. The apparatus of claim 9, wherein the dynamic control signaling comprises a downlink control information, and the semi-static control signaling comprises one or both of a medium access control-control element or a radio resource control message.

11. The apparatus of claim 9, wherein the control signaling indicates the transmission of the plurality of subpackets based at least in part on an association between an information element field associated with the control signaling and the set of beams, the information element field corresponding to a transmission configuration indicator index, a time-domain resource allocation index, a hybrid automatic repeat request index, or a bandwidth part index, or a combination thereof.

12. The apparatus of claim 9, wherein the instructions are further executable by the processor to cause the apparatus to:
assign an information element field associated with the control signaling to indicate the transmission of the plurality of subpackets,
wherein to transmit at least the number of subpackets of the plurality of subpackets is further based at least in part on assigning the information element field associated with the control signaling to indicate the transmission of the plurality of subpackets.

13. The apparatus of claim 1, wherein each subset of feedback bits of the plurality of subsets of feedback bits corresponds to one or both of a partition of a hybrid automatic repeat request codebook or an interleaving portion of the hybrid automatic repeat request codebook.

14. The apparatus of claim 1, wherein the instructions are further executable by the processor to cause the apparatus to:
receive control signaling indicating the transmission of each subset of feedback bits of the plurality of subsets of feedback bits on the different beams of the set of beams based at least in part on an uplink channel resource index, the uplink channel resource index comprising a physical uplink control channel resource index or a physical uplink shared channel resource index corresponding to the set of beams,
wherein to receive the subset of feedback bits of the plurality of subsets of feedback bits on the different beams of the set of beams is further based at least in part on the uplink channel resource index.

15. The apparatus of claim 14, wherein the set of beams for the transmission of each subset of feedback bits of the plurality of subsets of feedback bits is different from the set of beams for the transmission of each subpacket of the plurality of subpackets.

16. The apparatus of claim 1, wherein different subpackets of the plurality of subpackets correspond to different code blocks, redundancy versions, interleaving resources in one or both of a time domain or a frequency domain, or a combination thereof.

17. The apparatus of claim 1, wherein the instructions are further executable by the processor to cause the apparatus to:
multiplex the plurality of subpackets in one or more of a frequency domain, a time domain, or a spatial domain based at least in part on a frequency-division multiplexing scheme, a time-division multiplexing scheme, or a spatial-division multiplexing scheme, or a combination thereof,
wherein to transmit at least the number of subpackets of the plurality of subpackets is further based at least in part on multiplexing the plurality of subpackets in one or more of the frequency domain, the time domain, or the spatial domain.

18. The apparatus of claim 1, wherein each beam of the set of beams corresponds to one or more of a beam index, a reference signal resource index, a transmission configuration indicator state index, or a transmit-receive point index.

19. The apparatus of claim 1, wherein each beam of the set of beams comprises a synchronization signal block beam associated with a respective subpacket of the plurality of subpackets.

20. The apparatus of claim 1, wherein each subset of feedback bits of the plurality of subsets of feedback bits comprises hybrid automatic repeat request feedback bits.

21. The apparatus of claim 1, wherein a first order of beams of the set of beams used for transmission of the plurality of subpackets is different than a second order of beams of the one or more beams used to transmit the subset of feedback bits.

22. An apparatus for wireless communication, comprising:
a processor;
memory coupled with the processor; and
instructions stored in the memory and executable by the processor to cause the apparatus to:
receive at least a number of subpackets of a plurality of subpackets on different beams of a set of beams;
generate feedback based at least in part on receiving at least the number of subpacket of the plurality of subpackets;
segment the feedback into a plurality of subsets of feedback bits; and
transmit each subset of feedback bits of the plurality of subsets of feedback bits on one or more beams of the set of beams.

23. The apparatus of claim 22, wherein the instructions are further executable by the processor to cause the apparatus to:
aggregate the plurality of subpackets to form a packet based at least in part on receiving each subpacket of the plurality of subpackets on the different beams of the set of beams.

24. The apparatus of claim 22, wherein the instructions are further executable by the processor to cause the apparatus to:
transmit a beam report indicating the set of beams to use for transmission of the plurality of subpackets,
wherein to receive at least the number of subpackets of the plurality of subpackets on the different beams of the set of beams is further based at least in part on the transmitted beam report.

25. The apparatus of claim 22, wherein the instructions are further executable by the processor to cause the apparatus to:
transmit a channel state information report for the set of beams, the channel state information report comprising one or more of a channel quality indicator, a rank indicator, or a precoding matrix indicator,
wherein to receive at least the number of subpackets of the plurality of subpackets on the different beams of the set of beams is further based at least in part on the channel state information report for the set of beams.

26. The apparatus of claim 22, wherein the instructions are further executable by the processor to cause the apparatus to:

determine that each subpacket of the plurality of subpackets is not decodable separately from other subpackets of the plurality of subpackets; and decode the plurality of subpackets by jointly decrypting a quantity of subpackets of the plurality of subpackets using one or both of a coding scheme or a channel coding scheme, wherein to receive at least the number of subpackets of the plurality of subpackets is further based at least in part on jointly encrypting the plurality of subpackets.

27. The apparatus of claim 26, wherein the instructions are further executable by the processor to cause the apparatus to:

determine a threshold quantity of subpackets for decoding the plurality of subpackets based at least in part on a channel state information report for the set of beams, wherein to decode the plurality of subpackets by jointly decrypting the quantity of subpackets of the plurality of subpackets is further based at least in part on the threshold quantity of subpackets.

28. The apparatus of claim 22, wherein the instructions are further executable by the processor to cause the apparatus to:

perform a beam measurement on each beam of the set of beams;

determine a beam quality for each beam of the set of beams based at least in part on the performed beam measurement, the beam quality corresponding to reference signal received power value for each beam of the set of beams, wherein to receive at least the number of subpackets of the plurality of subpackets on the different beams of the set of beams is further based at least in part on the determined beam quality for each beam of the set of beams.

29. A method for wireless communication at a device, comprising:

segmenting a packet of information for a receiving device into a plurality of subpackets;

selecting a set of beams to use for transmission of the plurality of subpackets;

transmitting at least a number of subpackets of the plurality of subpackets on a different beam of the set of beams; and receiving a subset of feedback bits of a plurality of subsets of feedback bits associated with at least the number of subpackets on different beams of the set of beams based at least in part on transmitting at least the number of subpackets of the plurality of subpackets on one or more beams of the set of beams.

30. A method for wireless communication at a device, comprising:

receiving at least a number of subpackets of a plurality of subpackets on different beams of a set of beams;

generating feedback based at least in part on receiving each subpacket of the plurality of subpackets;

segmenting the feedback into a plurality of subsets of feedback bits; and transmitting each subset of feedback bits of the plurality of subsets of feedback bits on one or more beams of the set of beams.

* * * * *